United States Patent
Kim et al.

(10) Patent No.: US 9,389,723 B2
(45) Date of Patent: *Jul. 12, 2016

(54) MOBILE DEVICE AND METHOD FOR PROVIDING USER INTERFACE (UI) THEREOF

(71) Applicant: Samsung Electronics Co., Ltd., Gyeonggi-do (KR)

(72) Inventors: Bo-min Kim, Seoul (KR); Min-kyu Park, Gyeonggi-do (KR); Yong-gook Park, Gyeonggi-do (KR); Hyun-jin Kim, Seoul (KR); Tae-young Kang, Gyeonggi-do (KR); Han-chul Jung, Seoul (KR); Ji-sun Yang, Incheon (KR); Sang-ok Cha, Daegu (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/587,542

(22) Filed: Dec. 31, 2014

(65) Prior Publication Data

US 2015/0116269 A1 Apr. 30, 2015

Related U.S. Application Data

(63) Continuation of application No. 12/914,348, filed on Oct. 28, 2010, now Pat. No. 8,952,901.

(30) Foreign Application Priority Data

Oct. 30, 2009 (KR) .......................... 10-2009-0104288

(51) Int. Cl.
*G06F 3/041* (2006.01)
*G06F 3/0488* (2013.01)
*G06F 3/044* (2006.01)

(52) U.S. Cl.
CPC .............. *G06F 3/0414* (2013.01); *G06F 3/044* (2013.01); *G06F 3/04883* (2013.01); *G06F 2203/04101* (2013.01); *G06F 2203/04106* (2013.01); *G06F 2203/04808* (2013.01)

(58) Field of Classification Search
CPC .................................................. G06F 3/04883
USPC ................... 178/18.01–19.07; 345/173–178; 715/700–866
See application file for complete search history.

(56) References Cited

U.S. PATENT DOCUMENTS 6,593,914 B1 7/2003 Nuovo et al.
6,738,514 B1 5/2004 Shin et al.
(Continued)

FOREIGN PATENT DOCUMENTS

CN 1977521 6/2007
CN 101155205 4/2008
(Continued)

OTHER PUBLICATIONS

Korean Office Action dated Feb. 3, 2016 issued in counterpart application No. 10-2009-0104288, 7 pages.
(Continued)

*Primary Examiner* — Michael Pervan
(74) *Attorney, Agent, or Firm* — The Farrell Law Firm, P.C.

(57) ABSTRACT

A mobile device and a method for providing a User Interface (UI) thereof are provided. The mobile device includes a pressure detecting unit configured to detect a pressure, a user interface unit configured to perform a user interface, and a control unit configured to control the user interface unit to activate when the pressure detecting unit detects pressure and determine a function being performed by a user interface input through the user interface unit and the pressure detected at the pressure detecting unit.

16 Claims, 52 Drawing Sheets

(56) References Cited

U.S. PATENT DOCUMENTS

| | | |
|---|---|---|
| 6,756,969 B2 | 6/2004 | Nuovo et al. |
| 7,831,284 B2 | 11/2010 | Lee |
| 2003/0193480 A1 | 10/2003 | Nuovo et al. |
| 2004/0212597 A1 | 10/2004 | Nuovo et al. |
| 2005/0035955 A1 | 2/2005 | Carter et al. |
| 2006/0161871 A1 | 7/2006 | Hotelling et al. |
| 2007/0097095 A1 | 5/2007 | Kim et al. |
| 2008/0073192 A1 | 3/2008 | Lee |
| 2009/0027353 A1 | 1/2009 | Im et al. |
| 2009/0143106 A1 | 6/2009 | Meitzler et al. |
| 2010/0099394 A1* | 4/2010 | Hainzl .............. G06F 1/32 455/418 |
| 2010/0131880 A1 | 5/2010 | Lee et al. |

FOREIGN PATENT DOCUMENTS

| | | |
|---|---|---|
| CN | 101452365 | 6/2009 |
| EP | 2 076 000 | 7/2009 |
| JP | 11239201 | 8/1999 |
| JP | 2003140823 | 5/2003 |
| KR | 100557153 | 2/2006 |
| KR | 1020070046276 | 5/2007 |
| KR | 10-2009-0084636 | 8/2009 |
| WO | WO 00/08826 | 2/2000 |

OTHER PUBLICATIONS

European Search Report dated May 9, 2016 issued in counterpart application No. 10827142.0-1959, 8 pages.

* cited by examiner

FIG. 9

| PRESSURE | NEAR | UI FUNCTION |
|---|---|---|
| WEAK | 'NEAR' PROXIMATE (LEFT-RIGHT GESTURE) | TURN PAGE BY PAGE SLOWLY |
| | 'FAR' PROXIMATE (LEFT-RIGHT GESTURE) | TURN SEVERAL PAGES AT ONCE FAST |
| INTERMEDIATE | PROXIMATE (LEFT-RIGHT GESTURE) | TURN TWO OR MORE PAGES AT ONCE |
| STRONG | PROXIMATE (LEFT-RIGHT GESTURE) | TURN SEVERAL PAGES AT ONCE FAST |

MOBILE DEVICE AND METHOD FOR PROVIDING USER INTERFACE (UI) THEREOF

PRIORITY

This application is a Continuation Application of U.S. patent application Ser. No. 12/914,348, filed on Oct. 28, 2010, and claims priority under 35 U.S.C. §119(a) to Korean Patent Application No. 10-2009-0104288, filed on Oct. 30, 2009, in the Korean Intellectual Property Office, the content of each of which is incorporated herein by reference.

BACKGROUND

1. Field of the Invention

The present invention relates generally to a mobile device and a method for providing a User Interface (UI) thereof, and more particularly, to a mobile device that provides a UI using sensed pressure and a method for providing UI thereof.

2. Description of the Related Art

Current mobile devices are increasingly capable of providing various functions as related technologies advance. Users generally use a User Interface (UI) to utilize the functions provided by the mobile devices.

There are a variety of types of UIs. For example, a UI may be implemented as various buttons arranged on a mobile device, or as a touch screen. A user inputs a command to the mobile device through a UI to execute an intended function.

However, more UIs are needed in order to support the increasing number of functions provided by current mobile devices. Accordingly, there is a need for a method for providing a user with a UI that can be used easily without errors.

SUMMARY

The present invention has been made to address at least the above problems and/or disadvantages and to provide at least the advantages described below. Accordingly, an aspect of the present invention provides a mobile device in which an operating unit is activated upon detection of a pressure at a pressure detecting unit, and a method for providing a User Interface (UI) thereof.

According to an embodiment of the present invention, a mobile device is provided. The mobile device includes a pressure detecting unit configured to detect a pressure, a user interface unit configured to perform a user interface, and a control unit configured to control the user interface unit to activate when the pressure detecting unit detects pressure and determine a function being performed by a user interface input through the user interface unit and the pressure detected at the pressure detecting unit.

According to another embodiment of the present invention, a method for providing a User Interface (UI) is provided. The method includes detecting whether a user moves closer to the proximity sensor unit and detecting a presence of a proximate gesture, through a proximity sensor unit, detecting a touch manipulation, through a touch detecting unit, and detecting a button manipulation, through a button unit, wherein activating the user interface unit includes activating at least one of the proximity sensor unit, the touch detecting unit, and the button unit when the pressure detecting unit detects the pressure.

According to various embodiments of the present invention, the mobile device activates a manipulation unit upon detecting pressure through a pressure detecting unit, and accordingly, the user is able to manipulate various types of UIs, using a combination of pressure and various manipulation units.

Furthermore, since the user's intention to input manipulation is detected through the detection of pressure, the user is able to prevent inadvertent input of manipulation.

BRIEF DESCRIPTION OF THE DRAWINGS

The above and other aspects, features and advantages of the present invention will be more apparent from the following detailed description when taken in conjunction with the accompanying drawings, in which:

FIG. 9 is a table illustrating UI functions according to a degree of pressure detected at a pressure detecting unit and a proximate gesture detected at a proximity sensor unit, according to an embodiment of the present invention;

DETAILED DESCRIPTION OF EMBODIMENTS OF THE PRESENT INVENTION

Figure 1:
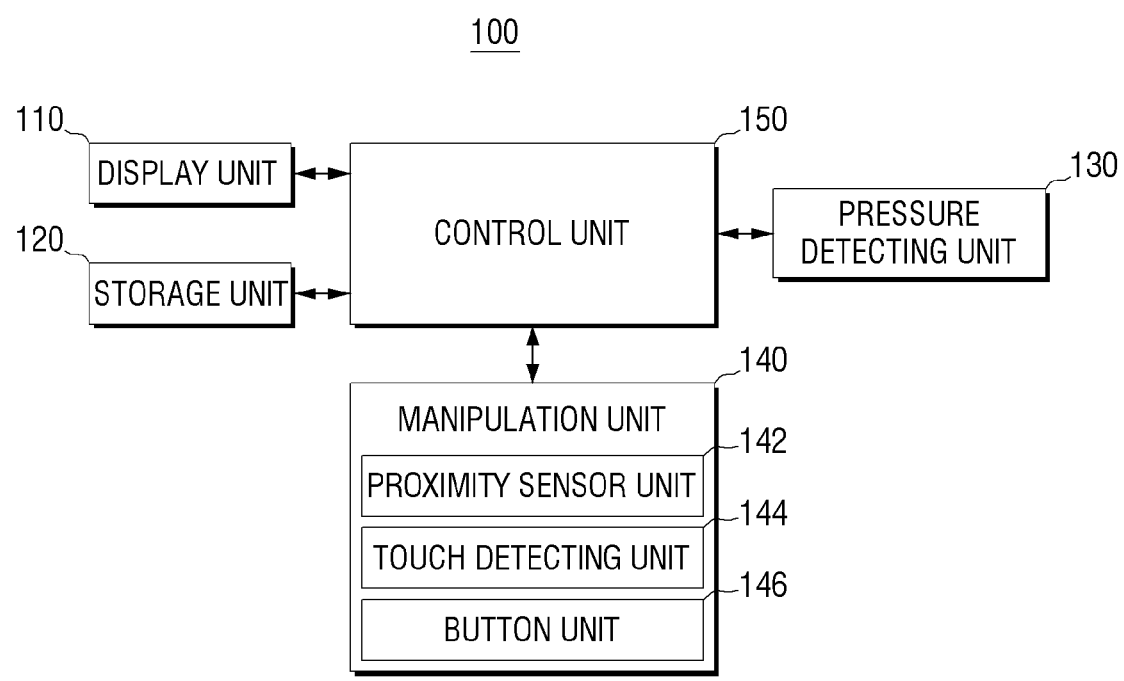
FIG. 1 is a block diagram of a detailed structure of a mobile device according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

FIG. 1 is a detailed block diagram of a mobile device 100 according to an embodiment of the present invention.

Referring to FIG. 1, the mobile device 100 may include a display unit 110, a storage unit 120, a pressure detecting unit 130, a manipulating unit (or user interface unit) 140, and a control unit 150.

The display unit 110 displays images corresponding to various functions of the mobile device 100, which include images corresponding to currently-executed applications and Graphic User Interfaces (GUI) for manipulation by the user.

The storage unit 120 stores programs that execute various functions of the mobile device 100, including application programs. The storage unit 120 may be implemented as a hard disc, nonvolatile memory, etc.

The pressure detecting unit 130 detects pressure exerted on a specific area of the mobile device 100. More specifically, the pressure detecting unit 130 detects whether pressure is applied to the pressure detecting unit 130 and a magnitude of the applied pressure. The pressure detecting unit 130 may be implemented as a variety of pressure detecting sensors, including, for example, a piezo sensor.

A piezo sensor does not require a separate power supply at an atmospheric condition. As pressure is applied, the piezo sensor generates electric power and perceives the applied pressure according to the voltage of the electric power as generated. Accordingly, by maintaining the piezo sensor in an activated state when the mobile device 100 is at an atmospheric condition, standby power can be minimized and power consumption can be reduced.

The manipulation unit (or user interface unit) 140 receives various manipulations from a user, and transmits the input user manipulations to the control unit 150. The manipulation unit (or user interface unit) 140 includes a variety of user interface devices. More specifically, the manipulation unit (or user interface unit) 140 may include a proximity sensor unit 142, a touch detecting unit 144 and a button unit 146.

The proximity sensor unit 142 detects whether a user, for example, is located at a predetermined proximity of the proximity sensor unit 142. The proximity sensory unit 142 may also detect a gesture at a predetermined proximity of the proximity sensor 142. The term "proximate gesture" herein refers to a gesture made by the user with a body part (such as hand, for example) placed at a proximity to the proximity sensor unit 142. For example, the proximate gesture may include a user's hand moving in a specific direction at a proximity to the proximity sensor unit 142.

The proximity sensor unit 142 includes at least one Light Emitting Diode (LED). A proximity sensor unit 142 including only one LED may detect whether an object is at a proximity to the proximity sensor unit 142, while a proximity sensor unit 142 including two LEDs may additionally detect the proximate gesture and proximity coordinates. A proximity sensor unit 142 with several LEDs may be able to detect the proximate gesture with increased accuracy compared to a proximity sensor unit having only two LEDs.

The touch detecting unit 144 detects touch manipulation by the user. The touch detecting unit 144 may be implemented as a touch screen.

The button unit 146 detects a button manipulation by the user. The button unit 146 includes at least one button. For example, the button unit 146 may include a number button, a direction button, etc.

The control unit 150 controls the overall operation of the mobile device 100, according to a user manipulation input through the manipulation unit (or user interface unit) 140. The control unit 150 controls so that the manipulation unit (or user interface unit) 140 is activated upon detection of applied pressure by the pressure detecting unit 130. Specifically, the control unit 150 controls the mobile device 100 so that, upon detection of the applied pressure at the pressure detecting unit 130, at least one of the proximity sensor units 142, the touch detecting unit 144 and the button unit 146 is activated. The term "activated" herein, with reference to the proximity sensor unit 142, refers to a state in which the proximity sensor unit 142 is able to detect whether an object is at a proximity and whether a proximate gesture is performed at the proximity. The term "activated" herein, with reference to the touch detecting unit 144, refers to a state in which the touch detecting unit 144 is able to detect the presence of touch manipulation. The term "activated" herein, with reference to the button unit 146, refers to a state in which the button unit 146 able to detect the presence of button manipulation.

Specifically, if the pressure detecting unit 130 detects applied pressure and the proximity sensor unit 142 detects a proximate gesture while a specific application is being executed, the control unit 150 performs functions related to the specific application and the detected proximate gesture. Furthermore, if the pressure detecting unit 130 detects the applied pressure and the touch detecting unit 144 detects presence of a touch manipulation while a specific application is being executed, the manipulation unit 130 performs functions related to the specific application and the detected touch manipulation. If the pressure detecting unit 130 detects applied pressure and the button unit 146 detects the presence of button manipulation while a specific application is being executed, the manipulation unit 130 performs functions related to the specific application and the detected button manipulation.

The control unit 150 may additionally determine a function to perform in response to the manipulation input through the manipulation unit (or user interface unit) 140, according to the magnitude of the detected pressure.

If the pressure detecting unit 130 includes one or more pressure detecting areas, the control unit 150 may additionally determine a function to perform in response to the manipulation input through the manipulation unit (or user interface unit) 140, according to the specific pressure detecting area of the pressure detecting areas that detects the pressure.

The control unit 150 may additionally determine a function to perform in response to the manipulation input through the manipulation unit (or user interface unit) 140, according to a number of times the pressure is detected at the pressure detecting unit 130.

The control unit 150 may also control the mobile device 100, such that the methods or processes for providing UI are provided as explained below with reference to FIGS. 2 to 20C.

Figure 2:
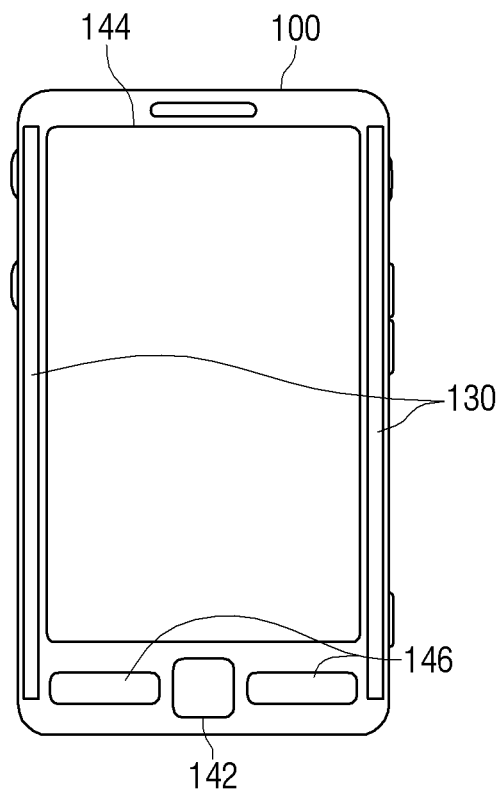
FIG. 2 is a view illustrating a pressure detecting unit, a proximity sensor unit, a touch detecting unit and a button unit according to an embodiment of the present invention.

FIG. 2 illustrates the pressure detecting unit 130, the proximity sensor unit 142, the touch detecting unit 144 and the button unit 146 arranged on an outer portion of the mobile device 100, according to an embodiment of the present invention.

Referring to FIG. 2, the mobile device 100 includes the pressure detecting unit 130 on both side portions thereof. The mobile device 100 also includes the touch detecting unit 144 on a display screen to provide a touch screen function. Additionally, the mobile device 100 includes the proximity sensor unit 142 and the button unit 146 on a lower portion of the screen.

The arrangement of components illustrated in FIG. 2 is provided only as an example. The pressure detecting unit 130, the proximity sensor unit 142, the touch detecting unit 144 and the button unit 146 of the mobile device 100 may be provided in different arrangements according to embodiments of the present invention.

User manipulation on the mobile device 100 is explained in detail below with reference to FIGS. 3A to 3C.

Figure 3A:
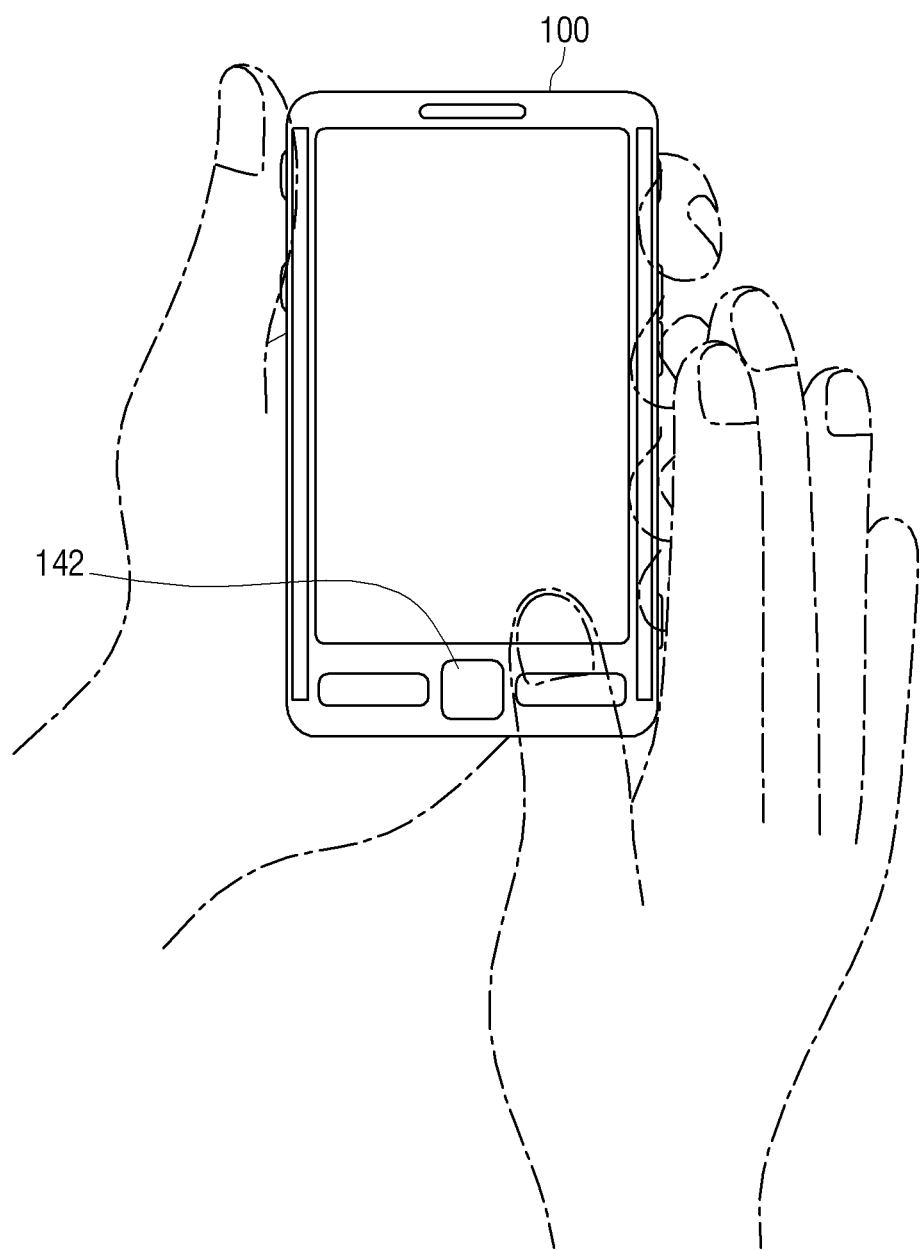
FIG. 3A illustrates a manner of inputting user manipulation using the pressure detecting unit and the proximity sensor unit of a mobile device, according to an embodiment of the present invention.

FIG. 3A illustrates a user manipulation method using the pressure detecting unit 130 and the proximity sensor unit 142, according to an embodiment of the present invention.

Referring to FIG. 3A, as a user holds the mobile device 100 on both side portions thereof, the mobile device 100 detects applied pressure through the pressure detecting unit 130 arranged on both side portions. Accordingly, if the pressure detecting unit 130 detects the applied pressure, the mobile device 100 activates the proximity sensor unit 142 so that the proximity sensor unit 142 detects whether the user is at a proximity to the proximity sensory unit 142 and also detects whether a proximate gesture is performed.

Since the proximity sensor unit 142 is activated in response to the detection of the applied pressure at the pressure detecting unit 130, the proximity sensor unit 142 only detects gestures that are intentionally input by the user. Furthermore, since the proximity sensor unit 142 is in a deactivated state in a standby mode when the pressure detecting unit 130 does not detect any pressure, the mobile device 100 uses only a minimum level of electricity in the standby mode.

Figure 3B:
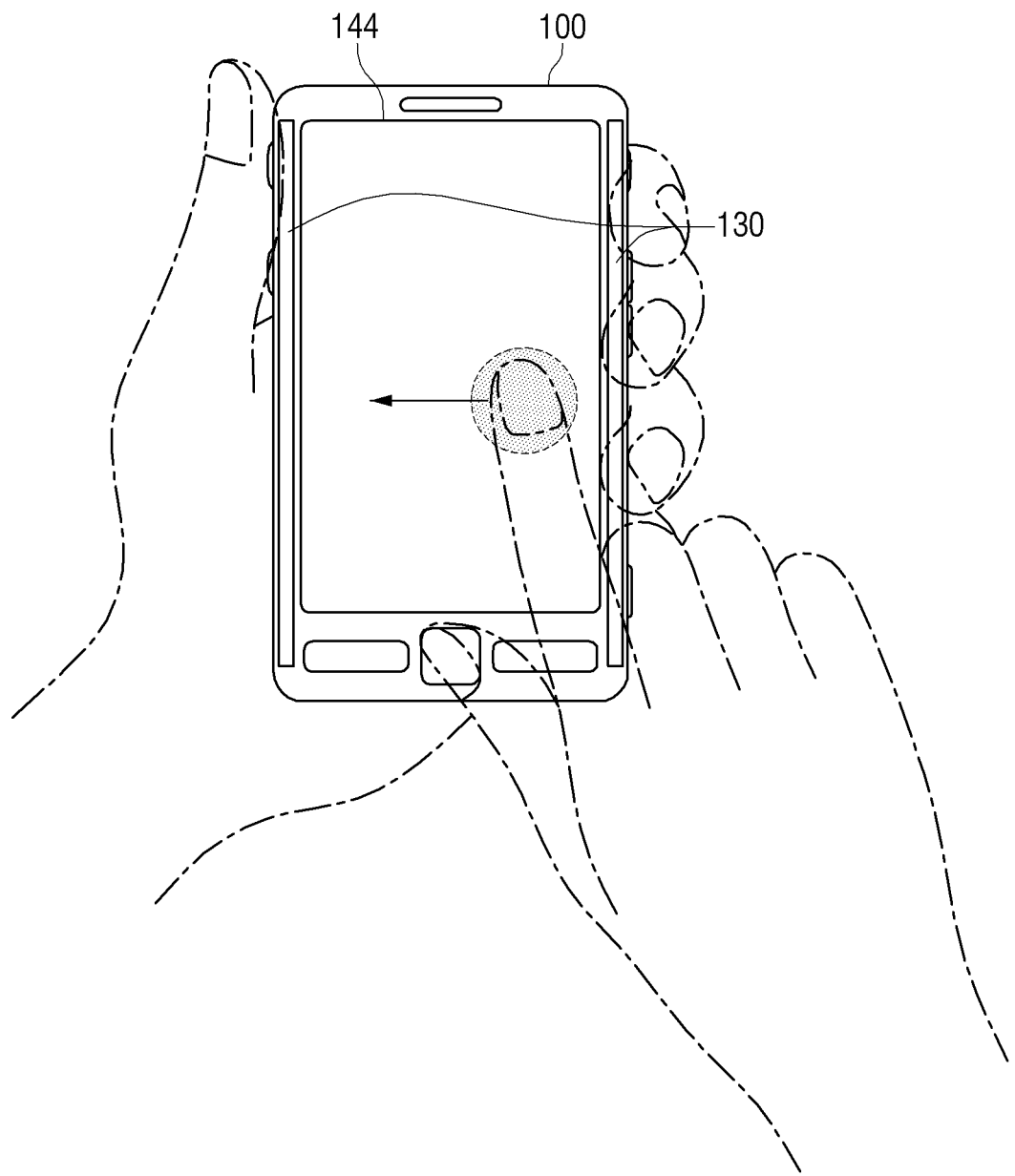
FIG. 3B illustrates a manner of inputting user manipulation using a pressure detecting unit and a button unit of a mobile device, according to an embodiment of the present invention.

FIG. 3B illustrates a user's manipulation method using the pressure detecting unit 130 and the touch detecting unit 144 of the mobile device 100, according to an embodiment of the present invention.

As explained above with reference to FIG. 3A, the mobile device 100 detects the applied pressure through the pressure detecting unit 130 arranged on both side portions, as the user holds the mobile device 100 on both sides. Accordingly, as the pressure detecting unit 130 detects the applied pressure, the mobile device 100 activates the touch detecting unit 144 so that the touch detecting unit 144 perceives the touch manipulation by the user on the display screen.

Since the touch detecting unit 144 is activated in response to the detection of the applied pressure at the pressure detecting unit 130, the touch detecting unit 144 only detects touches that are intentionally input by the user. Furthermore, since the touch detecting unit 144 is in a deactivated state in a standby mode where the pressure detecting unit 130 does not detect the pressure, the mobile device 100 needs a minimum level of electricity in the standby mode.

Figure 3C:
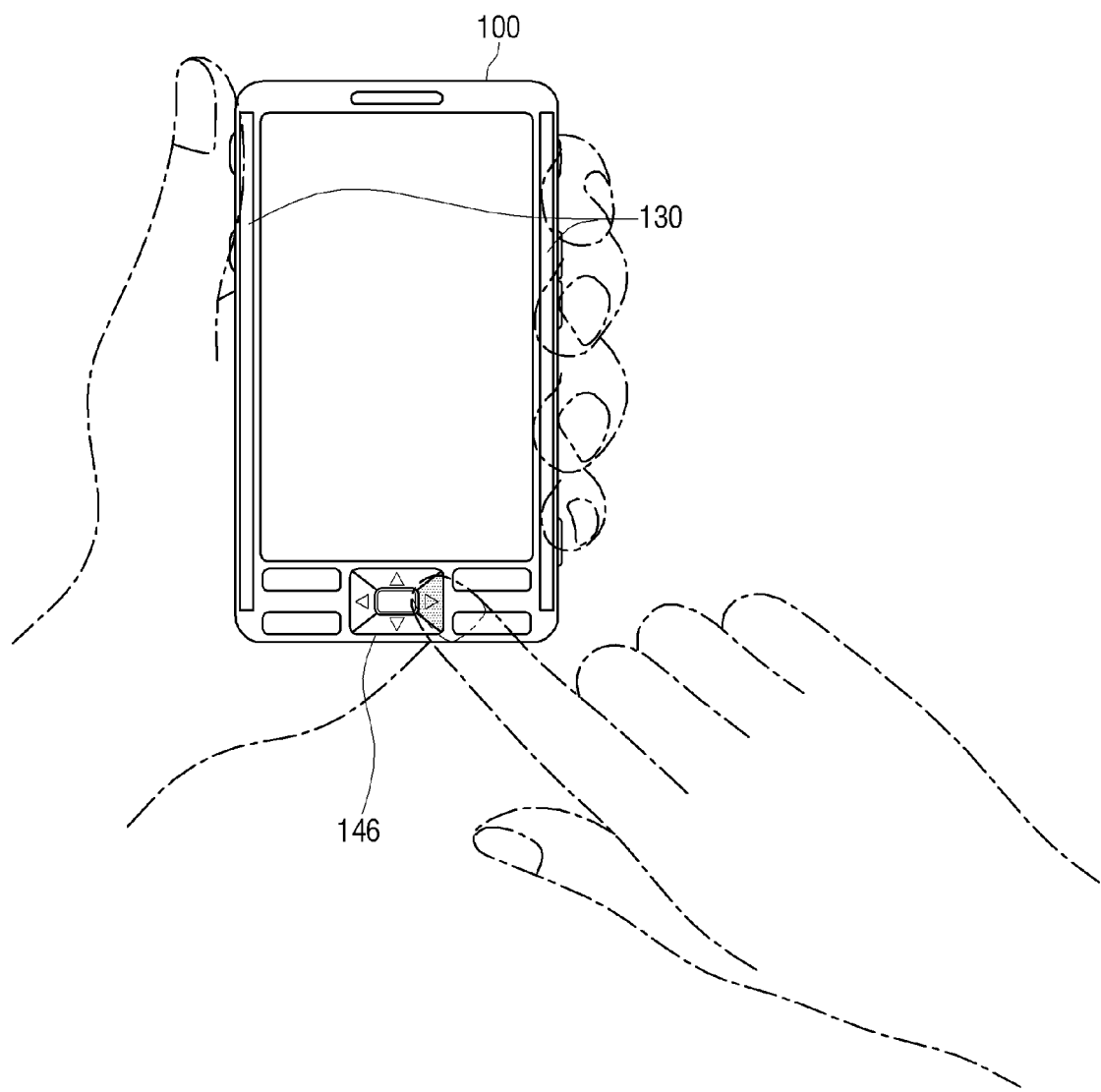
FIG. 3C illustrates a manner of inputting user manipulation using a pressure detecting unit and a button unit of a mobile device, according to an embodiment of the present invention.

FIG. 3C illustrates a user manipulation method using the pressure detecting unit 130 and the button unit 146, according to an embodiment of the present invention.

Referring to FIG. 3C, as the user holds the mobile device 100 on both side portions thereof, the mobile device 100 detects applied pressure through the pressure detecting unit 130 arranged on both side portions. Accordingly, if the pressure detecting unit 130 detects the applied pressure, the mobile device 100 activates the button unit 146 so that the button unit 146 perceives whether the user is at a proximity, and also perceives whether a proximate gesture is performed.

Since the button unit 146 is activated in response to the detection of the applied pressure at the pressure detecting unit 130, the button unit 146 only detects gestures that the user intends to input. Furthermore, since the button unit 146 is in a deactivated state in a standby mode where the pressure detecting unit 130 does not detect the pressure, the mobile device 100 only requires a minimum level of electricity in the standby mode.

As explained above, the proximity sensor unit 142, the touch detecting unit 144 and the button unit 146 of the mobile device 100 are in a deactivated state if the pressure detecting unit 130 does not detect the applied pressure. Then, in response to the detection of pressure at the pressure detecting unit 130, at least one of the proximity sensor unit 142, the touch detecting unit 144, and the button unit 146 is changed to an activated state.

Accordingly, the mobile device 100 requires only a minimum level of power consumption in a standby mode. A user is also able to input an intended manipulation without error, since the can input an intention to provide input manipulation through the pressure detecting unit 130.

Figure 4:
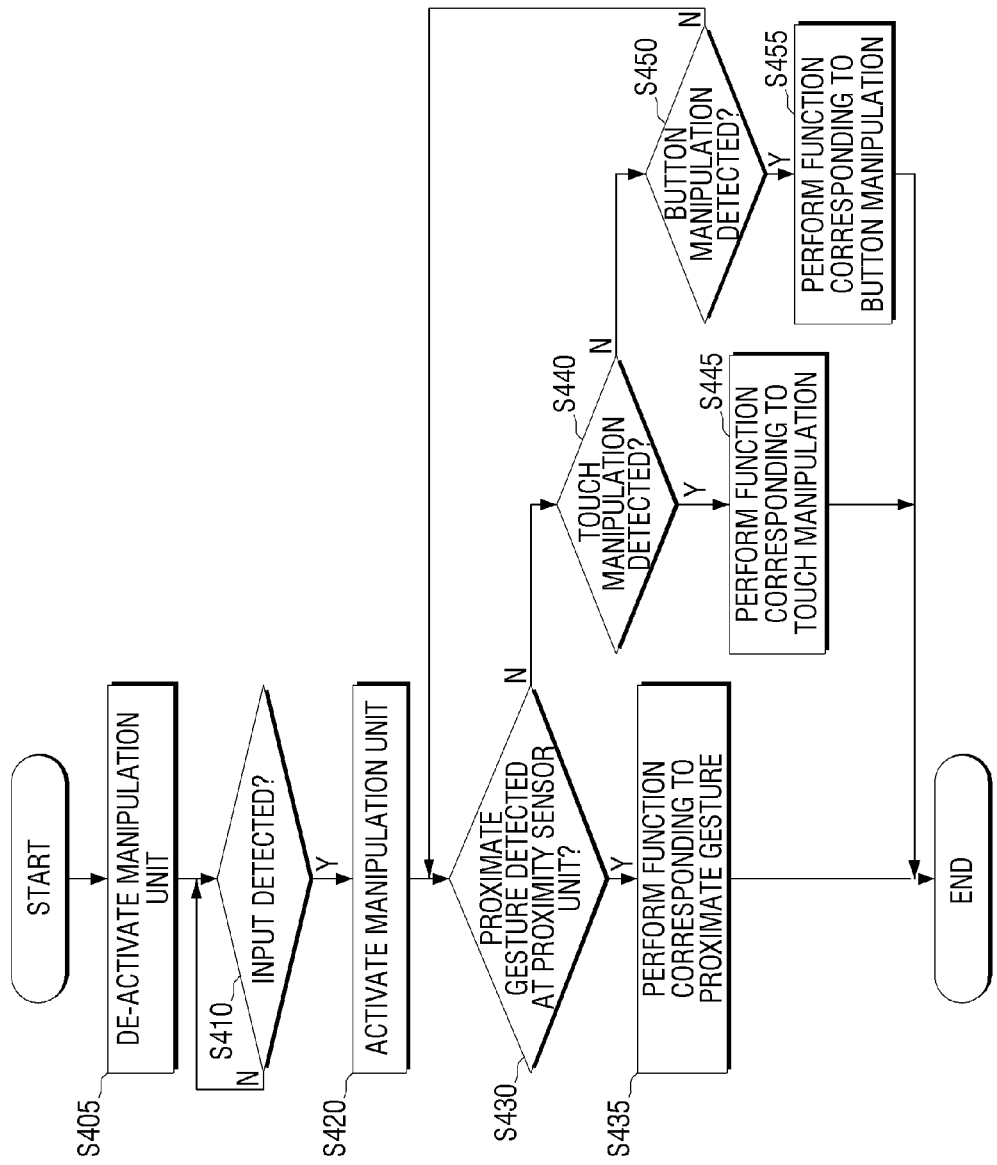
FIG. 4 is a flowchart illustrating a method for providing a User Interface (UI) of a mobile device according to an embodiment of the present invention.

FIG. 4 is a flowchart illustrating a method of the mobile device 100 for providing a UI, according to an embodiment of the present invention.

At step S405, the mobile device 100 keeps the manipulation unit (or user interface unit) 140 in a deactivated state. At step S410, the mobile device 100 determines whether the pressure detecting unit 130 detects pressure. At S410-Y, if the pressure detecting unit 130 detects applied pressure, the mobile device 100 activates the manipulation unit (or user interface unit) 140, at step S420.

At step S430, the mobile device 100 determines whether a proximate gesture is detected at the proximity sensor unit 142. At step S430-Y, if the proximity sensor unit 142 detects proximate gesture, at step S435, the mobile device 100 performs a function corresponding to the proximate gesture detected at the proximity sensor unit 142.

At step S440, the mobile device 100 determines whether a user's touch manipulation is detected at the touch detecting unit 144. At step S440-Y, if the touch detecting unit 144 detects the user's touch manipulation, at step S445, the mobile device 100 performs the function corresponding to the touch manipulation detected at the touch detecting unit 144.

At step S450, the mobile device 100 determines whether the button unit 146 detects a user's button manipulation. At step S450-Y, if the button unit 146 detects the user's button manipulation, at step S455, the mobile device 100 performs the function corresponding to the button manipulation detected at the button unit 146.

Accordingly, the mobile device 100 is capable of providing a UI, using the pressure detecting unit 130 and the manipulation unit (or user interface unit) 140. According to the above-described method for providing a UI according to an embodiment of the present invention, since the button unit 146 is activated in response to the detection of applied pressure at the pressure detecting unit 130, the button unit 146 detects only the gesture intended by the user. Furthermore, since the button unit 146 is in a deactivated state in a standby mode where pressure is not detected by the pressure detecting unit 130, the mobile device 100 requires only a minimum level of electricity in the standby mode.

As explained above, the proximity sensor unit 142, the touch detecting unit 144 and the button unit 146 are in a deactivated state unless the pressure detecting unit 130 detects pressure. Accordingly, in response to the detection of pressure at the pressure detecting unit 130, at least one of the proximity sensor unit 142, the touch detecting unit 144, and the button unit 146 is changed to an activated state.

Accordingly, the mobile device 100 consumes a minimum level of electricity in a standby mode. Additionally, the user is able to input an intended manipulation without errors, since the user can input an intention to start inputting manipulations through the pressure detecting unit 130.

Figure 5A:
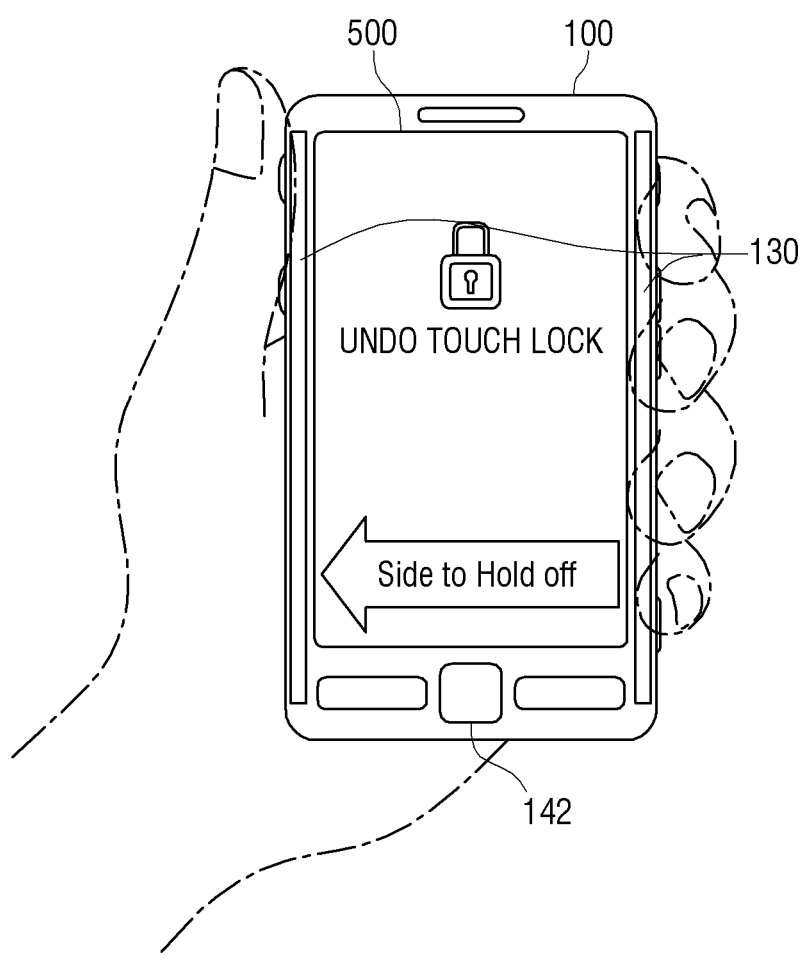
FIGS. 5A to 5C illustrate a process of changing a mobile device from a hold-on state to a hold-off state, according to an embodiment of the present invention.
Figure 5B:
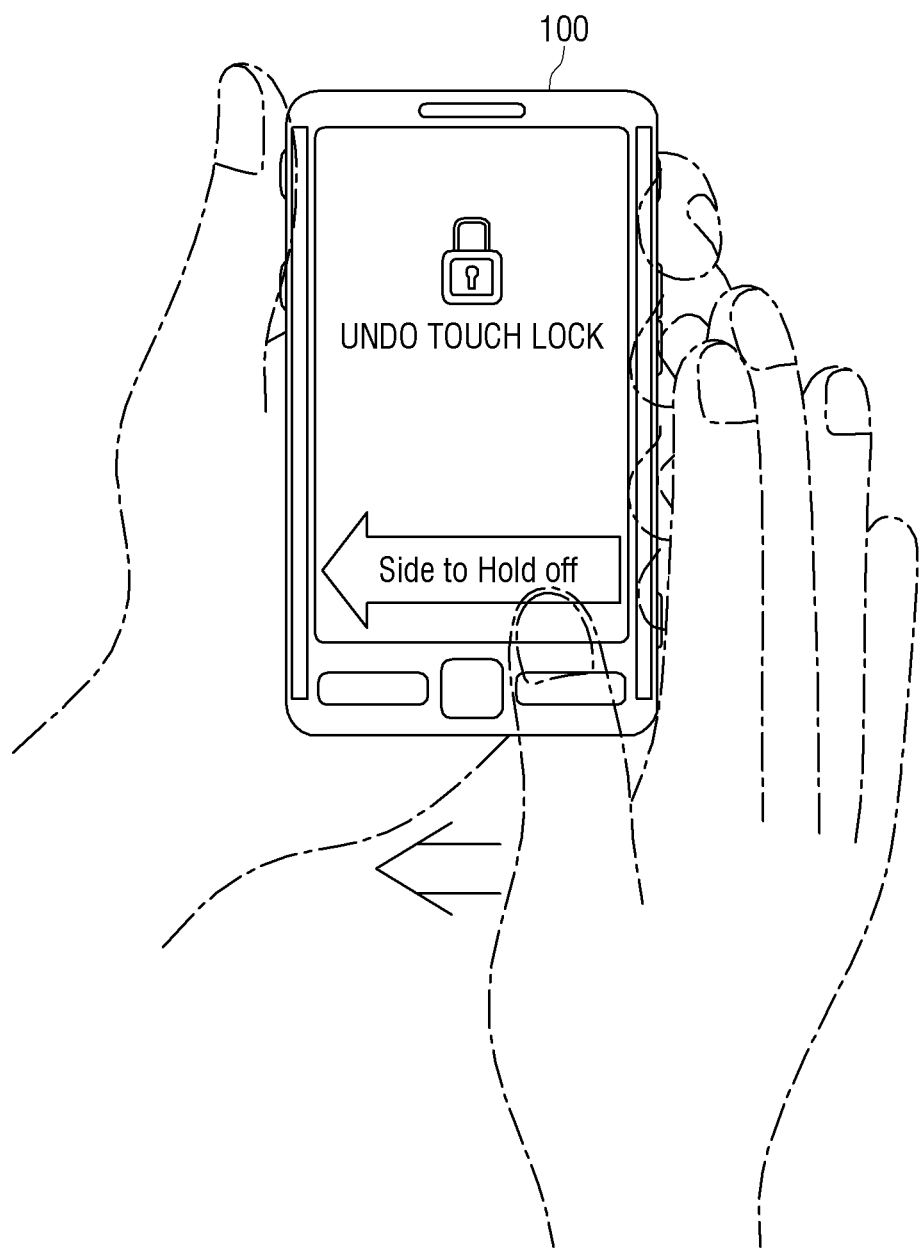
Figure 5C:

Manipulation of the mobile device 100 is explained in greater detail below, with reference to related drawings. FIGS. 5A to 5C illustrate a process of changing the mobile device 100 from hold-on state to hold-off state, according to an embodiment of the present invention.

FIG. 5A illustrates a lock screen 500 displayed on a screen of the mobile device 100 according to an embodiment of the present invention. Referring to FIG. 5A, the pressure detecting unit 130 is arranged on both side portions of the mobile device 100, and the proximity sensor unit 142 is arranged on a lower portion of the screen. As the user holds the mobile device 100 with fingers contacting the pressure detecting unit 130, the proximity sensor unit 142 is activated from a deactivated state.

FIG. 5B illustrates a user inputting a proximate gesture to the proximity sensor unit 142 from the right to the left according to an embodiment of the present invention. As illustrated in FIG. 5B, in response to the user's proximate gesture input in a leftward direction to the proximity sensor unit 142 in a state that the user is holding the pressure detecting unit 130, the mobile device 100 performs an unlocking function.

Accordingly, as illustrated in FIG. 5C, the mobile device 100 is changed to unlocked state and displays the unlocked screen 510 on the screen.

As explained above, the mobile device 100 is capable of unlocking according to a manipulation input to the pressure detecting unit 130 and the proximity sensor unit 142.

Figure 6A:
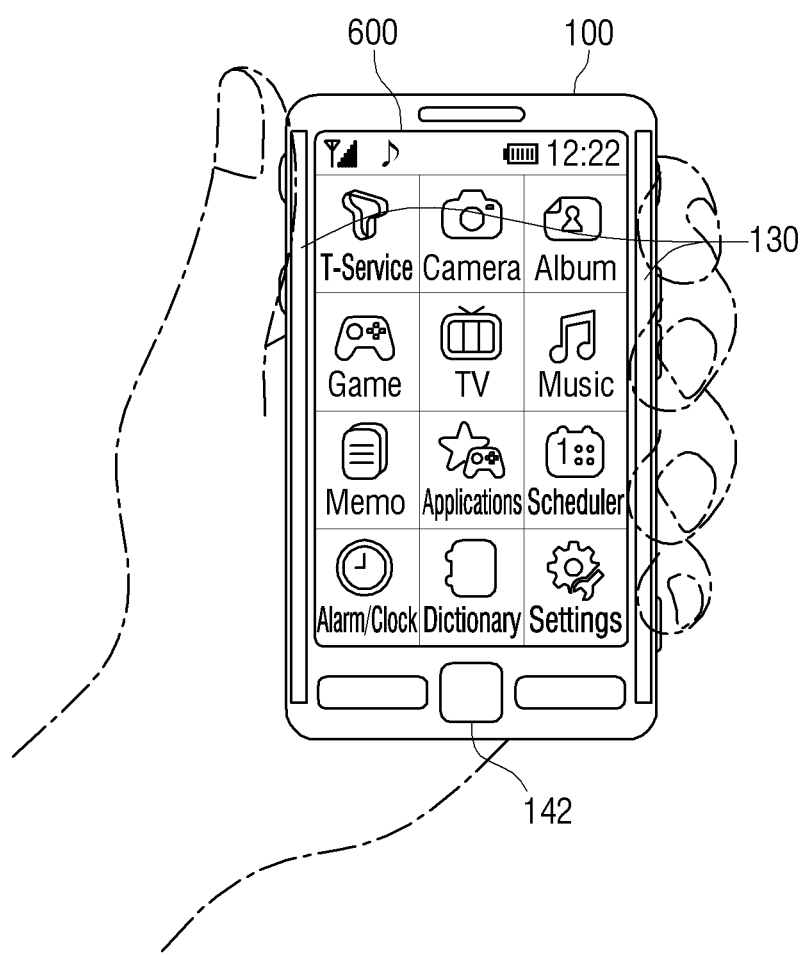
FIGS. 6A to 6C illustrate a process of changing a mobile device from a hold-off state to a hold-on state, according to an embodiment of the present invention.
Figure 6B:
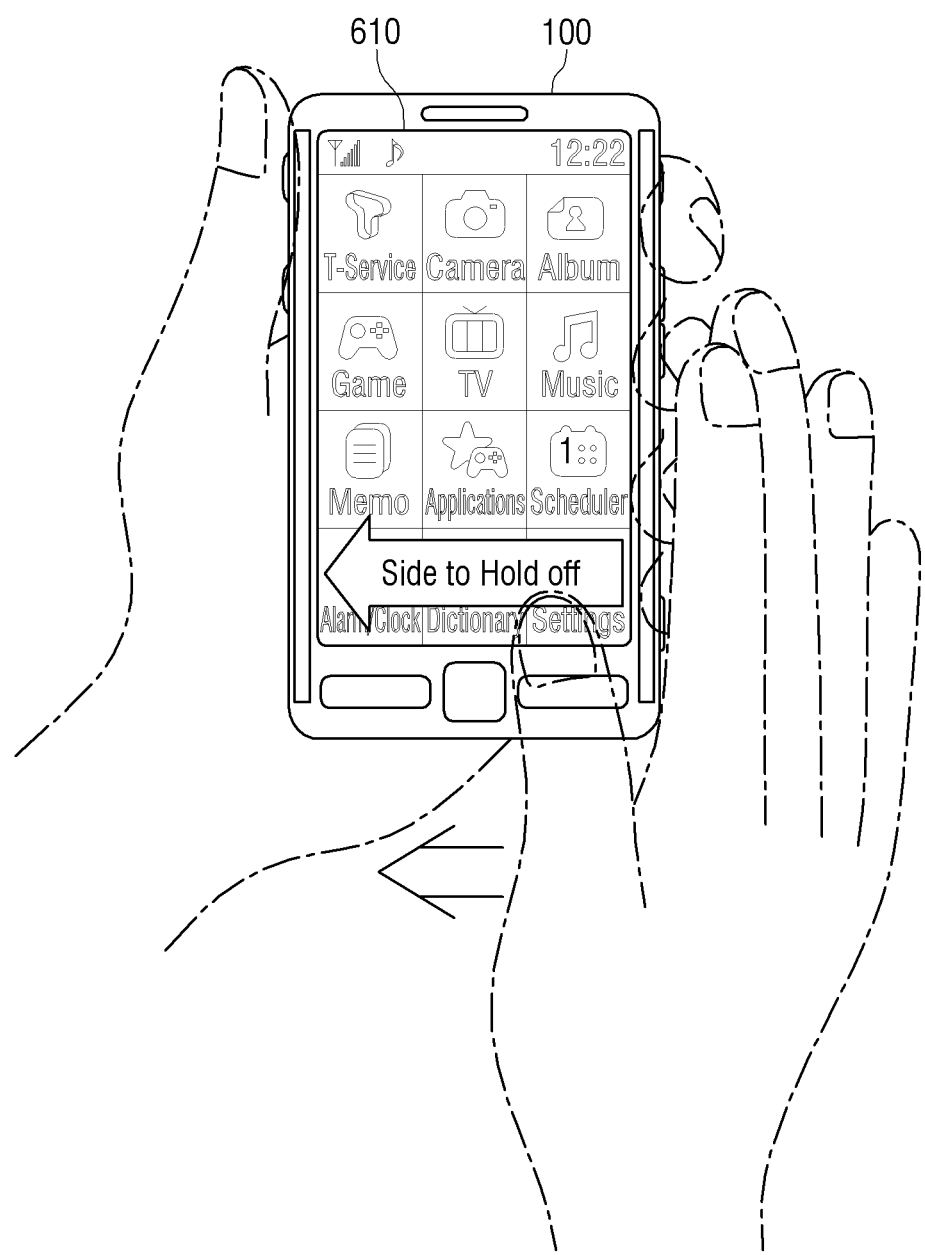
Figure 6C:
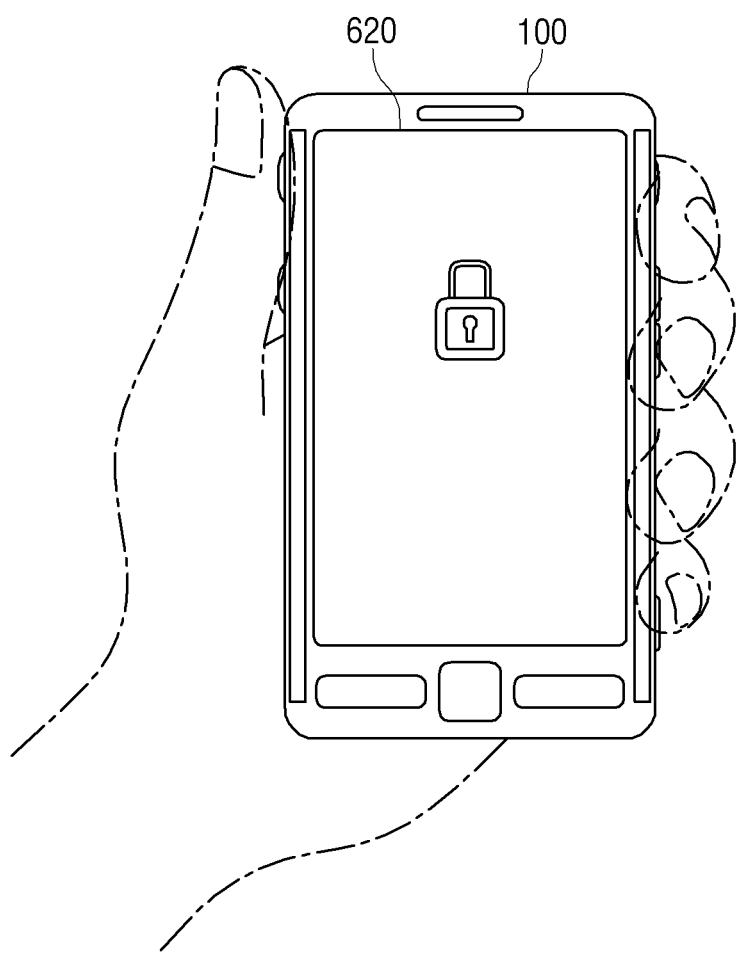

FIGS. 6A to 6C illustrate a process of changing the mobile device 100 from a hold-off state to hold-on state, according to an embodiment of the present invention.

FIG. 6A illustrates the unlocked screen 600 appearing on the screen of the mobile device 100 according to an embodiment of the present invention. Referring to FIG. 6A, the pressure detecting unit 130 is arranged on both side portions of the mobile device 100, and the proximity sensor unit 142 is arranged on a lower portion of the screen. As the user presses the pressure detecting unit 130 twice as shown in FIG. 5A, the proximity sensor unit 142 is activated from a deactivated state, and a screen 610 to set a lock appears as illustrated in FIG. 6B. A 'screen 610 to set lock' is a transition screen provided to indicate a transition from an unlocked state to a locked state according to an input of a specific manipulation.

FIG. 6B illustrates a user inputting a proximate gesture to the proximity sensor unit 142 in a leftward direction, to initiate a lock function according to an embodiment of the present invention.

Referring to FIG. 6B, as the user presses the pressure detecting unit 130 twice and inputs a proximate gesture to the proximity sensor unit 142 in a leftward direction, the mobile device 100 performs the lock function in response.

Accordingly, as illustrated in FIG. 6C, the mobile device 100 changes to the locked state and the locked state 620 is displayed on the screen.

As explained above, the mobile device 100 is capable of performing a lock function according to a manipulation input to the pressure detecting unit 130 and the proximity sensor unit 142.

Meanwhile, the mobile device 100 may perform different functions in response to the same manipulation, depending on the respective pressure detecting areas of the pressure detecting unit 100. This performance of different functions is explained in greater detail below with reference to FIGS. 7A to 8B.

Figure 7A:
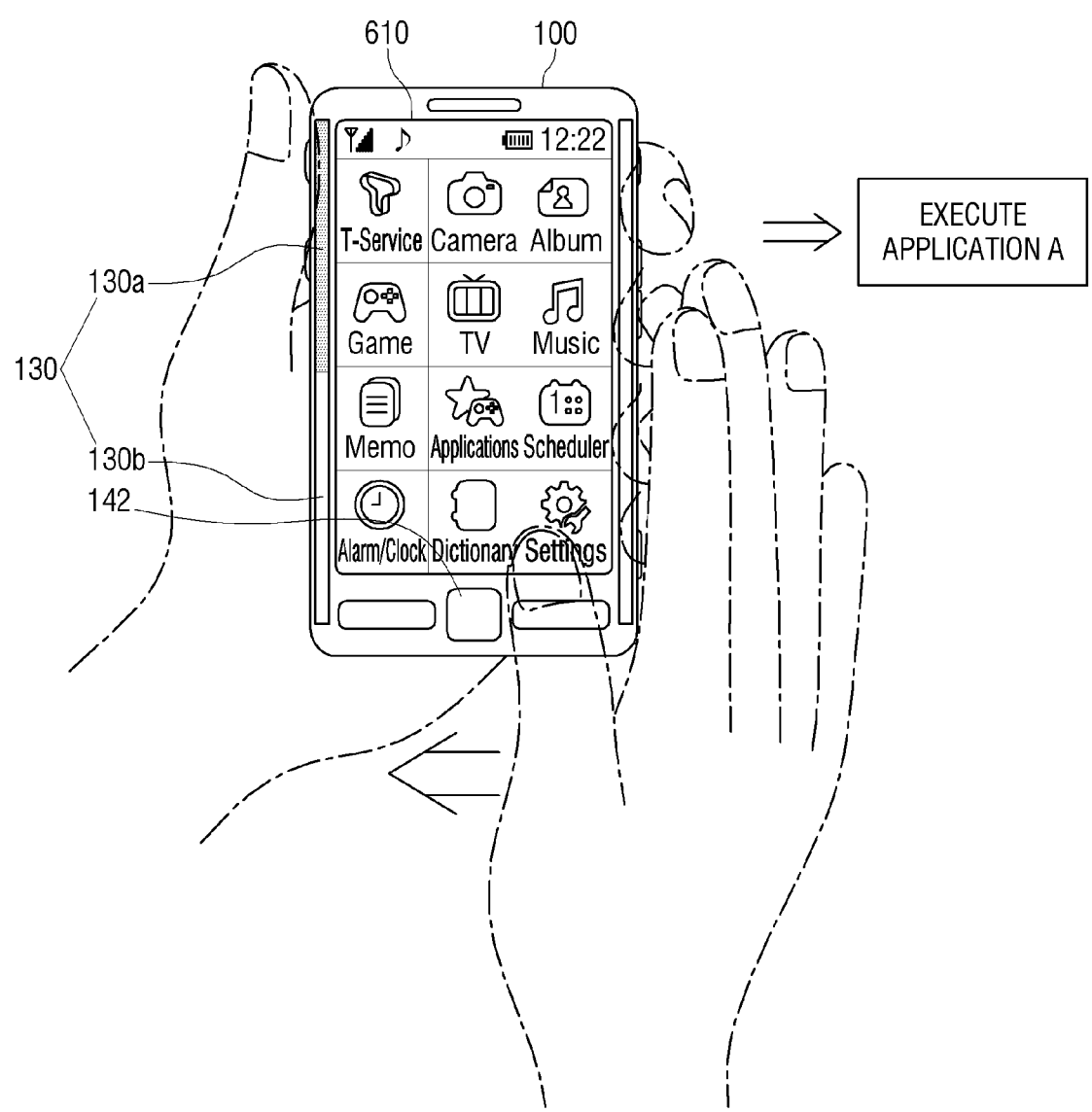
FIGS. 7A and 7B illustrate a mobile device performing different functions for respective pressure detecting areas of a pressure detecting unit, according to an embodiment of the present invention.
Figure 7B:
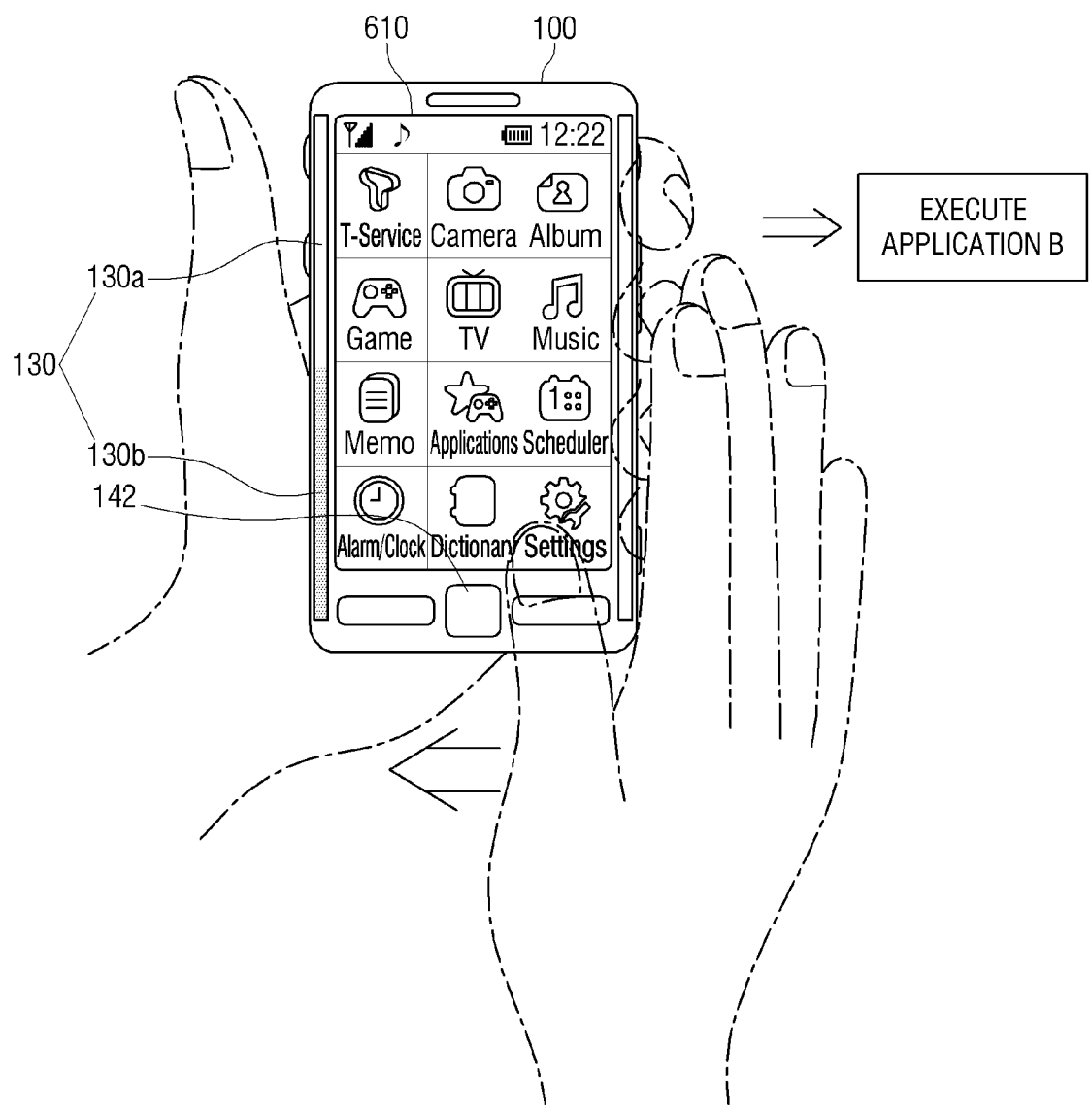

FIGS. 7A and 7B illustrate a mobile device 100 performing different functions for respective pressure detecting areas of the pressure detecting unit 130, according to an embodiment of the present invention.

The pressure detecting unit 130 includes a first pressure detecting area 130a and a second pressure detecting area 130b. Referring to FIG. 7A, the first pressure detecting area 130a corresponds to an upper area on a left side of the mobile device 100, and the second pressure detecting area 130b corresponds to a lower area on the left side of the mobile device 100.

FIG. 7A illustrates an example in which the first pressure detecting area 130a of the mobile device 100 detects the applied pressure, and the user's proximate gesture is input in leftward direction to the proximity sensor unit 142. Referring to FIG. 7A, if a user's proximate gesture is input into the proximity sensor unit 142 in leftward direction while user is pressing on the first pressure detecting area 130a of the pressure detecting unit 130, the mobile device 100 performs a corresponding application (i.e., application A) in response.

FIG. 7B illustrates another example in which the second pressure detecting area 130b of the mobile device 100 detects applied pressure, and the user's proximate gesture is input, to the proximity sensor unit 142, in a leftward direction. Referring to FIG. 7B, if a user's proximate gesture is input into the proximity sensor unit 142 in the leftward direction while the user is pressing the second pressure detecting area 130b of the pressure detecting unit 130, the mobile device 100 performs a corresponding application (i.e., application B) in response.

As explained above, the pressure detecting unit 130 may include multiple pressure detecting areas, and the mobile device 100 may perform different functions in response to the same proximate gesture manipulation, depending on the areas that detect the pressure.

Figure 8A:
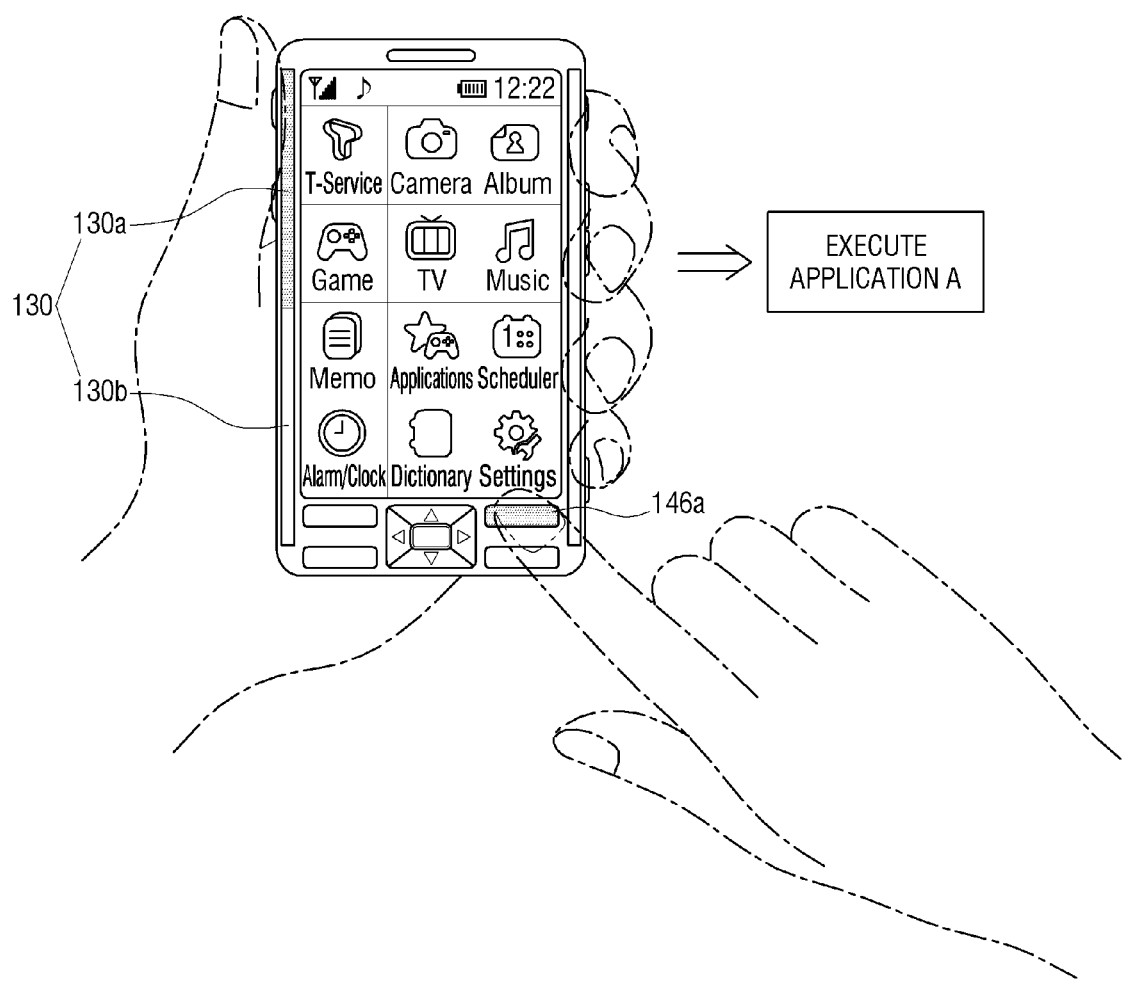
FIGS. 8A and 8B illustrate a mobile device performing different functions for respective pressure detecting areas of a pressure detecting unit, according to an embodiment of the present invention.
Figure 8B:
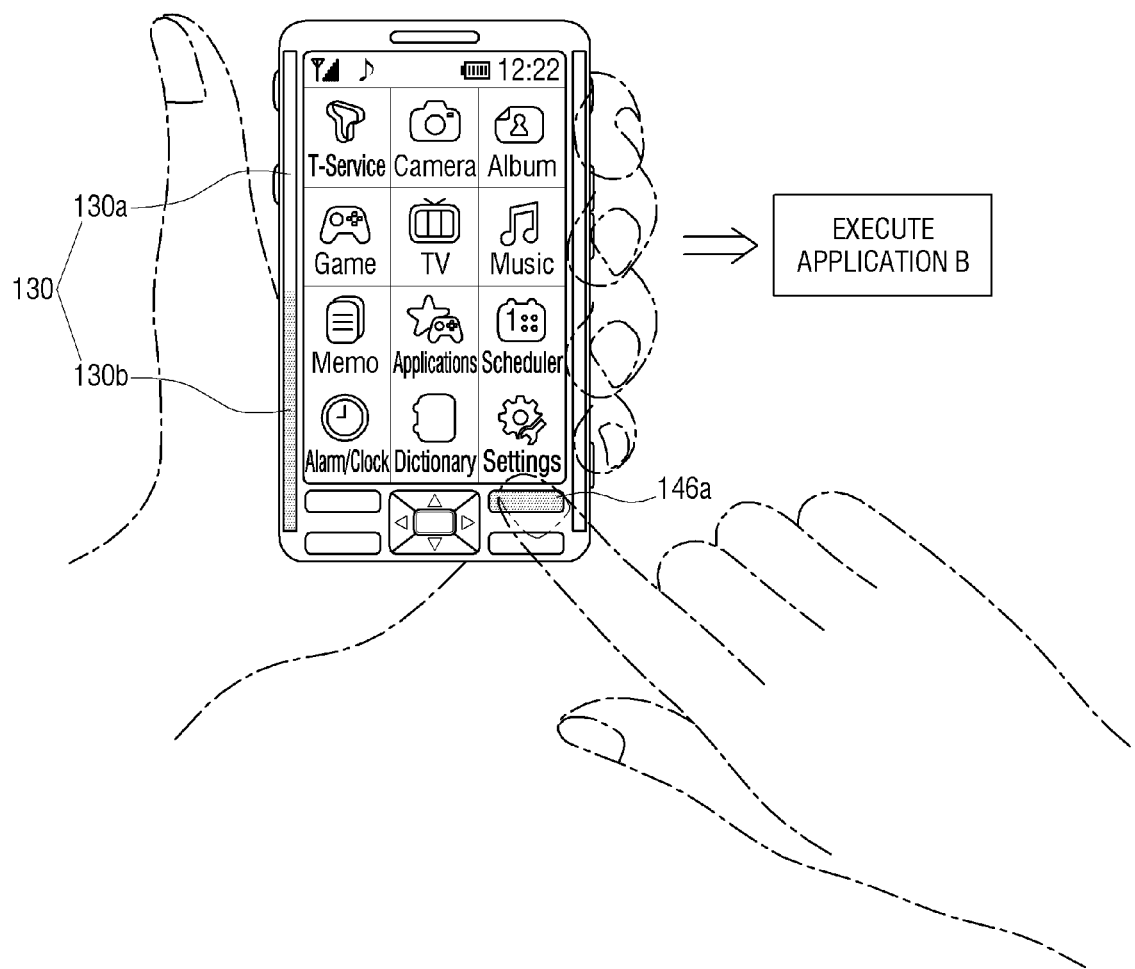

FIGS. 8A and 8B illustrate the mobile device 100 performing different functions for respective pressure detecting areas of the pressure detecting unit 130, according to an embodiment of the present invention.

The pressure detecting unit 130 includes a first pressure detecting area 130a and a second pressure detecting area 130b. Referring to FIG. 8A, the first pressure detecting area 130a corresponds to an upper area on a left side of the mobile device 100, and the second pressure detecting area 130b corresponds to a lower area on the left side of the mobile device 100.

FIG. 8A illustrates an example in which the first pressure detecting area 130a of the mobile device 100 detects applied pressure, and the user inputs manipulation through a specific button 146 of the mobile device 100. Referring to FIG. 8A, if a user inputs manipulation through the specific button 146 while pressing the first pressure detecting area 130a of the pressure detecting unit 130, the mobile device 100 performs a corresponding application (i.e., application A) in response.

FIG. 8B illustrates another example in which the second pressure detecting area 130b of the mobile device 100 detects an applied pressure, and the user inputs a manipulation through the specific button 146a of the mobile device 100. Referring to FIG. 8B, if a user inputs manipulation through the specific button 146a while pressing the second pressure detecting area 130b of the pressure detecting unit 130, the mobile device 100 performs a corresponding application (i.e., application B) in response.

As explained above, the pressure detecting unit 130 may include multiple pressure detecting areas, and the mobile device 100 may perform different functions in response to the same button manipulation, depending on the areas that detect the pressure.

Accordingly, the mobile device 100 may perform different functions in response to the same touch manipulation, depending on areas that detect the pressure.

Meanwhile, the mobile device 100 may provide different functions in response to the same manipulation, depending on the magnitude of pressure detected as the pressure detecting unit 130. Referring to FIGS. 9 to 11E, a process of providing different functions in response to the same manipulation, depending on the magnitude of pressure detected as the pressure detecting unit 130, is explained below in greater detail.

FIG. 9 is a table of the UI functions according to the magnitude of pressure detected at the pressure detecting unit, and the proximate gestures detected at the proximity sensor unit 142, according to an embodiment of the present invention.

Referring to FIG. 9, according to an embodiment of the present invention, the magnitude of pressure may include three stages, such as "weak", "intermediate," and "strong." The proximate gestures may include two categories according to distance, such as, a "near" proximate gesture and a "far" proximate gesture. The "near" proximate gesture refers to an instance where the user's hand is very close to the proximity sensor unit 142, and the "far" proximate gesture refers to an instance where the user's hand is relatively further away from the proximity sensor unit 142.

If the pressure detecting unit 130 detects "weak" pressure, and the proximity sensor unit 142 detects the "near" proximate gesture, photographs are turned slowly as a corresponding UI function. If the pressure detecting unit 130 detects "weak" pressure, and the proximity sensor unit 142 detects the "far" proximate gesture, photographs are turned quickly as a corresponding UI function. If the pressure detecting unit 130 detects "intermediate" pressure, and the proximity sensor unit 142 detects the "near" proximate gesture, several photographs are turned at once the corresponding UI function. If the pressure detecting unit 130 detects "strong" pressure, and the proximity sensor unit 142 detects the "near" proximate gesture, several photographs are turned quickly as the corresponding UI function.

Figure 10A:
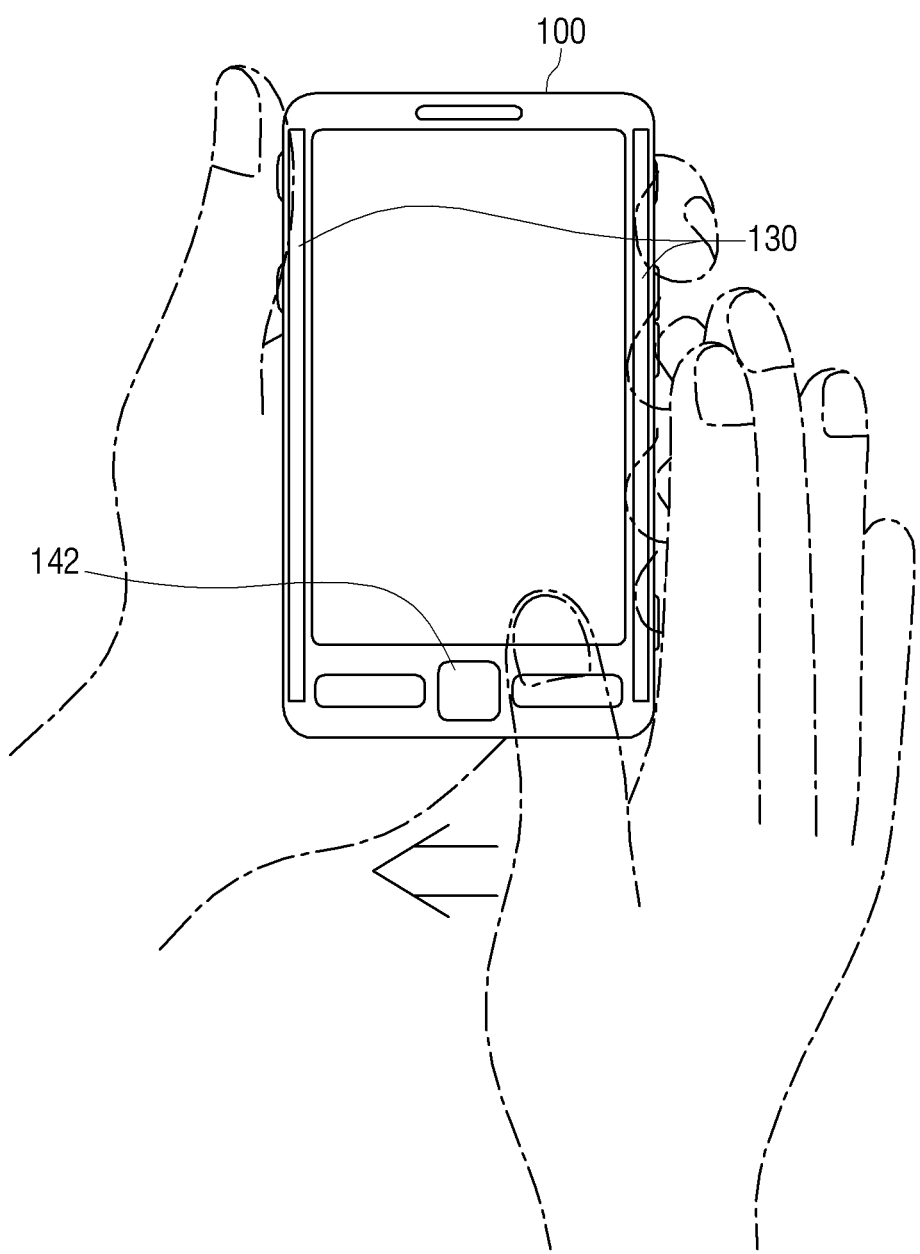
FIGS. 10A to 10C illustrate a process of manipulating photographs that appear on a screen, according to an embodiment of the present invention.
Figure 10B:
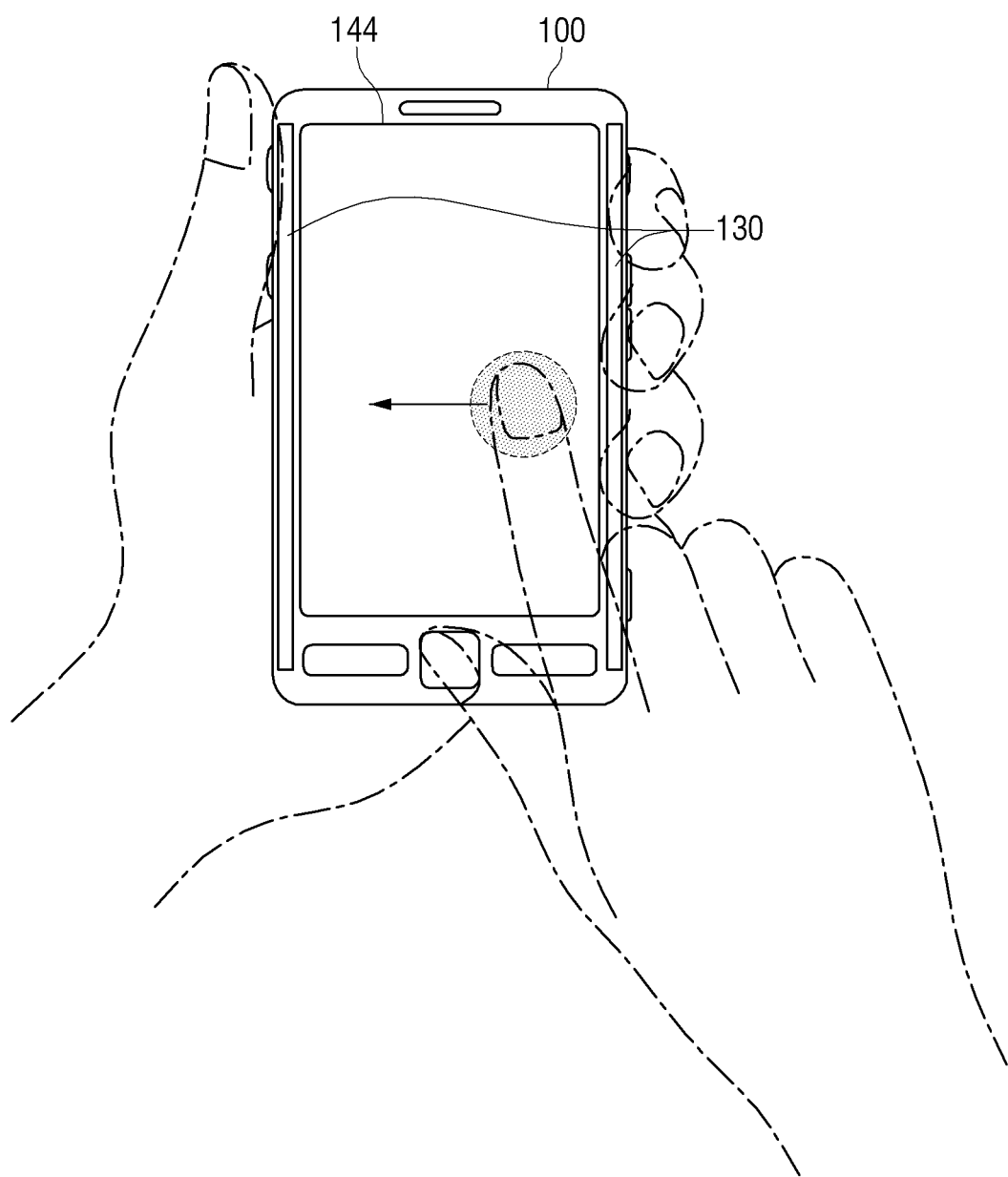
Figure 10C:
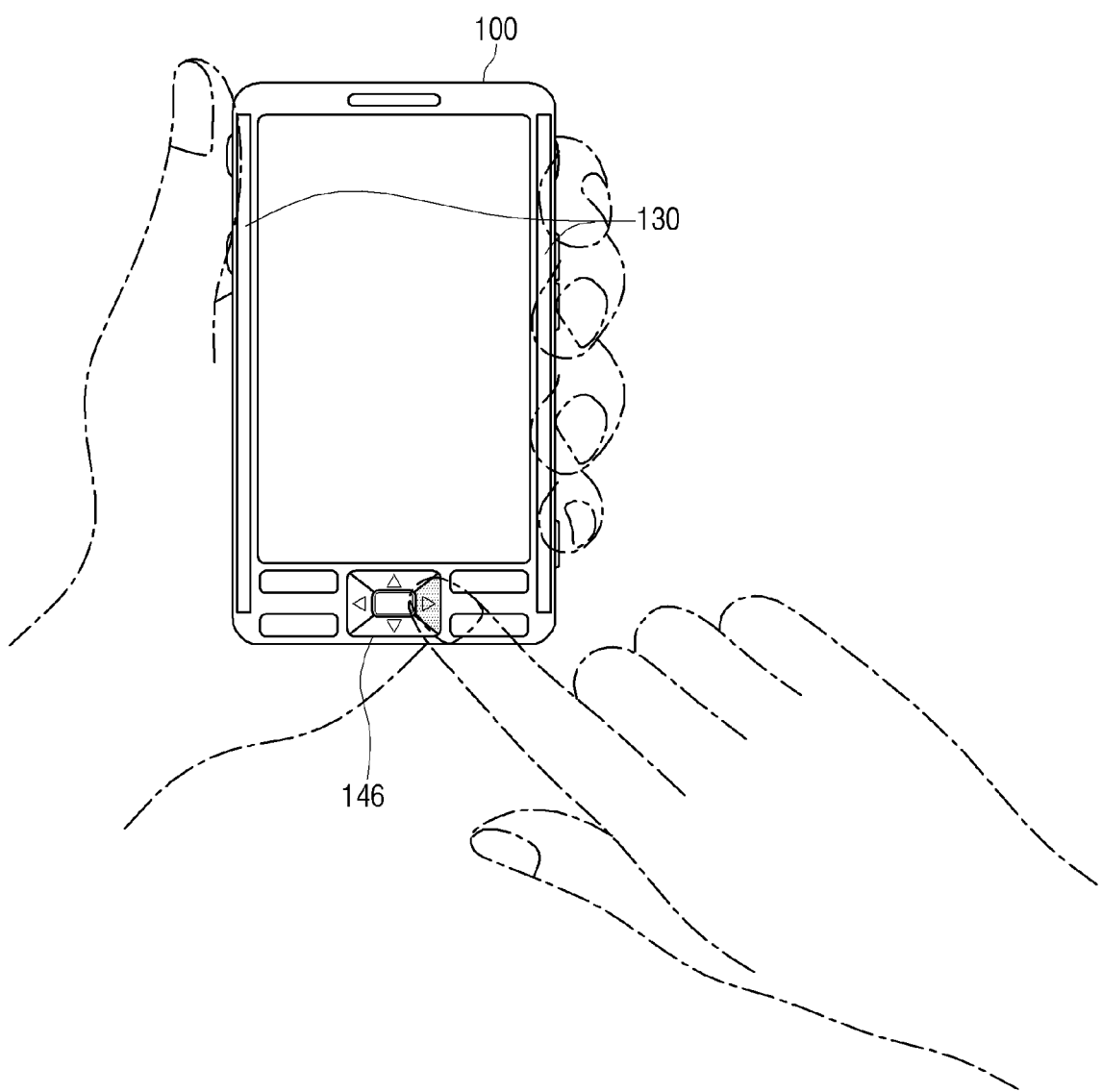

FIGS. 10A to 10C illustrate a process of providing user input such that a next photograph is displayed on the screen, according to an embodiment of the present invention. FIG. 10A illustrates an example in which the pressure detecting unit 130 detects applied pressure, and the user's proximate gesture is input in a leftward direction into the proximity sensor unit 142. Referring to FIG. 10A, if the user inputs a proximate gesture in the leftward direction into the proximity sensor unit 142, while applying pressure on the pressure detecting unit 130, the mobile device 100 performs the page-turning function as a corresponding function.

FIG. 10B illustrates an example in which the pressure detecting unit 130 detects applied pressure, and the user's touch manipulation is input, into the proximity sensor unit 142, in a leftward direction. Referring to FIG. 10B, if the user inputs touch manipulation in the leftward direction into the proximity sensor unit 142, while applying pressure on the pressure detecting unit 130, the mobile device 100 performs the page-turning function as a corresponding function.

FIG. 10C illustrates an example in which the pressure detecting unit 130 detects applied pressure, and the user provides button input indicating a rightward direction into the button unit 146. Referring to FIG. 10C, if the user inputs button manipulation in the rightward direction into the proximity sensor unit 142, while applying pressure on the pressure detecting unit 130, the mobile device 100 performs the page-turning function as a corresponding function.

FIGS. 11A to 11E illustrate a page-turning function performed in response to a magnitude of pressure detected at the pressure detecting unit 130 and proximate gesture detected at the proximity sensor unit 142, according to an embodiment of the present invention.

Referring to FIGS. 11A to 11E, photographs stored in the mobile device 100 may include a first photograph 1110, a second photograph 1120, a third photograph 1130, and a fourth photograph 1140.

Figure 11A:
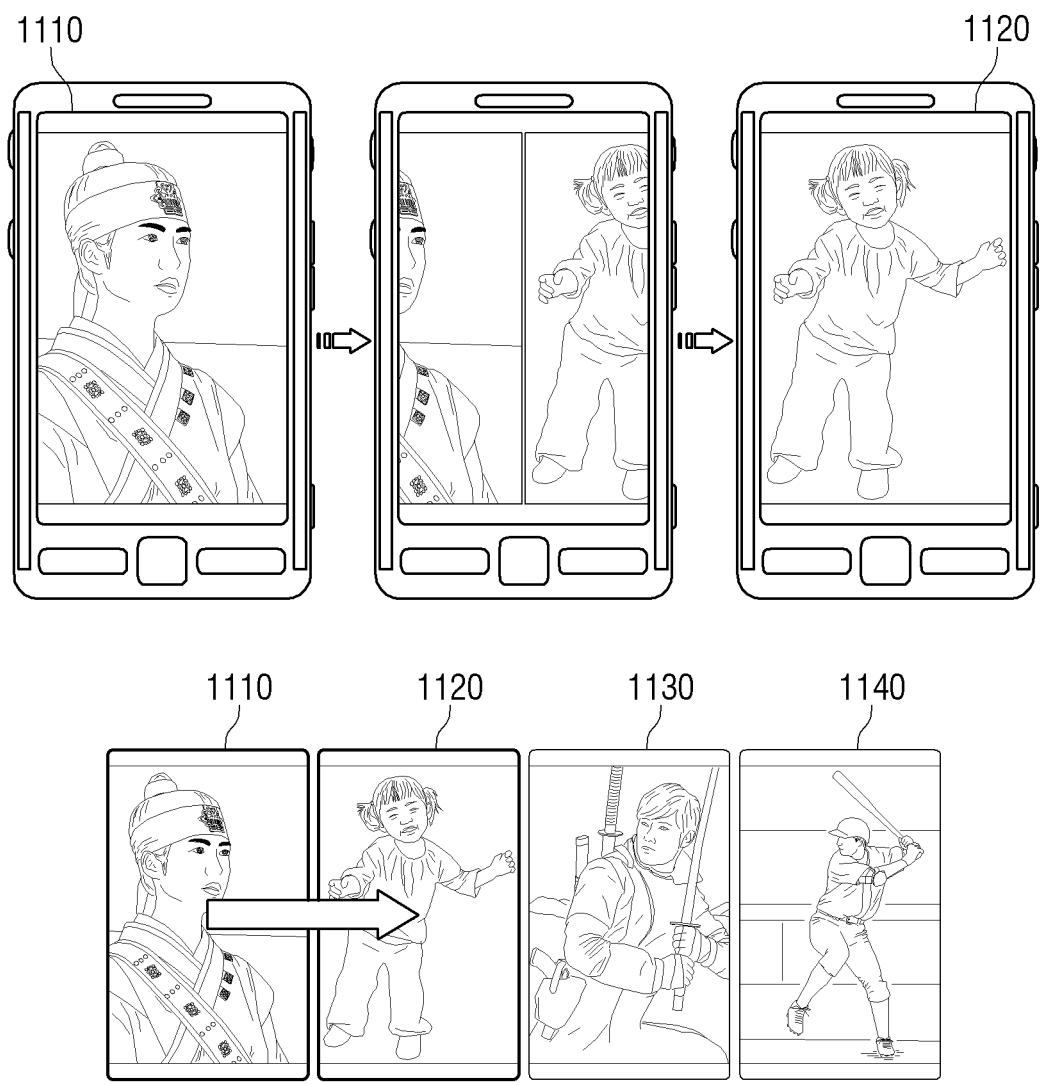
FIGS. 11A to 11E illustrate page turning function according to a degree of pressure detected at a pressure detecting unit and a proximate gesture detected at a proximity sensor unit, according to an embodiment of the present invention.

FIG. 11A illustrates an example in which slowly turning photographs page-by-page is performed as a corresponding UI function, when the pressure detecting unit 130 detects "weak" pressure and the proximity sensor unit 142 detects a "near" proximate gesture. Referring to FIG. 11A, if the pressure detecting unit 130 detects "weak" pressure and the proximity sensor unit 142 detects a "near" proximate gesture in a leftward direction, the mobile device 100 changes from displaying the first photograph 1110 to displaying the second photograph 1120, thereby performing the page-turning function.

Figure 11B:
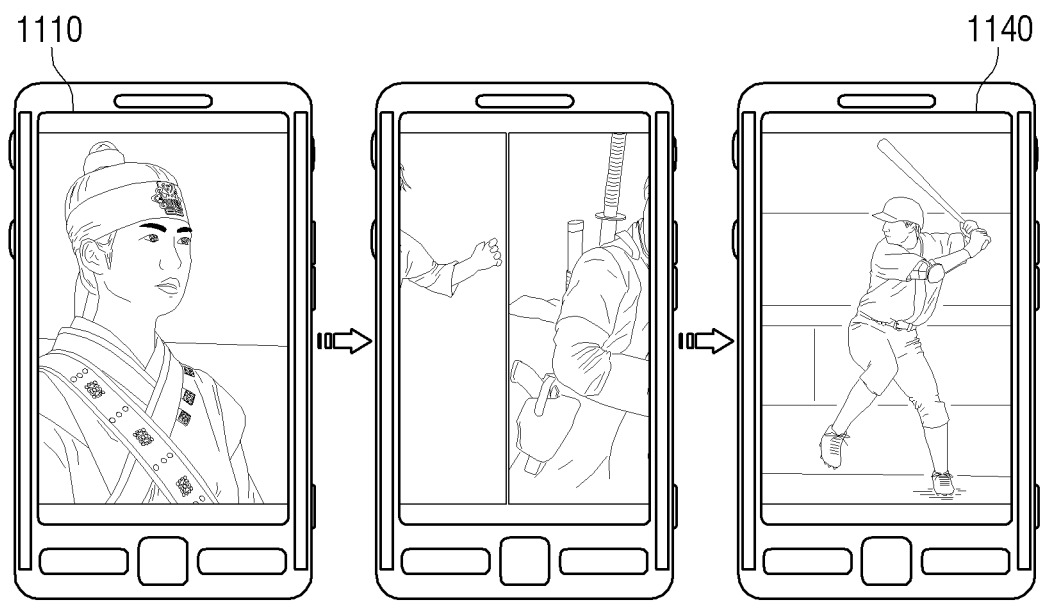
Figure 11B:
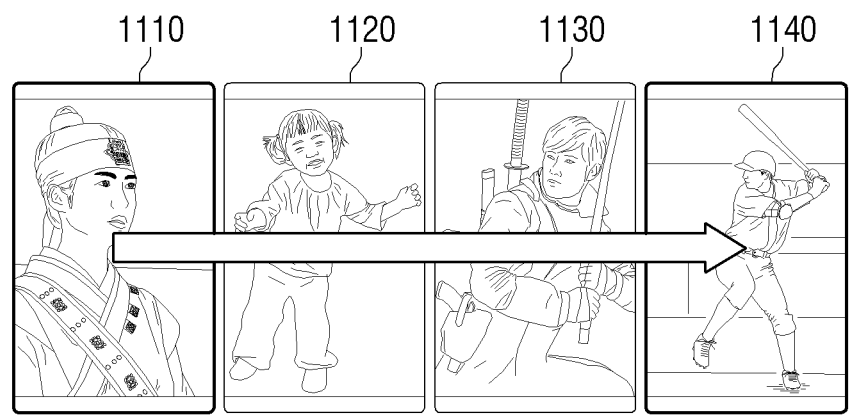

FIG. 11B illustrates an example in which the function of quickly turning through several photographs at once is performed as a corresponding UI function, when the pressure detecting unit 130 detects "weak" pressure and the proximity sensor unit 142 detects a "far" proximate gesture. Referring to FIG. 11B, if the pressure detecting unit 130 detects a "weak" pressure and the proximity sensor unit 142 detects "far" proximate gesture, a function of turning through three pages of photographs at once is performed as a corresponding UI function. If the pressure detecting unit 130 detects "weak" pressure and the proximity sensor unit 142 detects a "far" proximate gesture in a leftward direction, the mobile device 100 changes from displaying the first photograph 1110 to displaying the fourth photograph 1140, thereby turning through three pages of photographs.

Figure 11C:
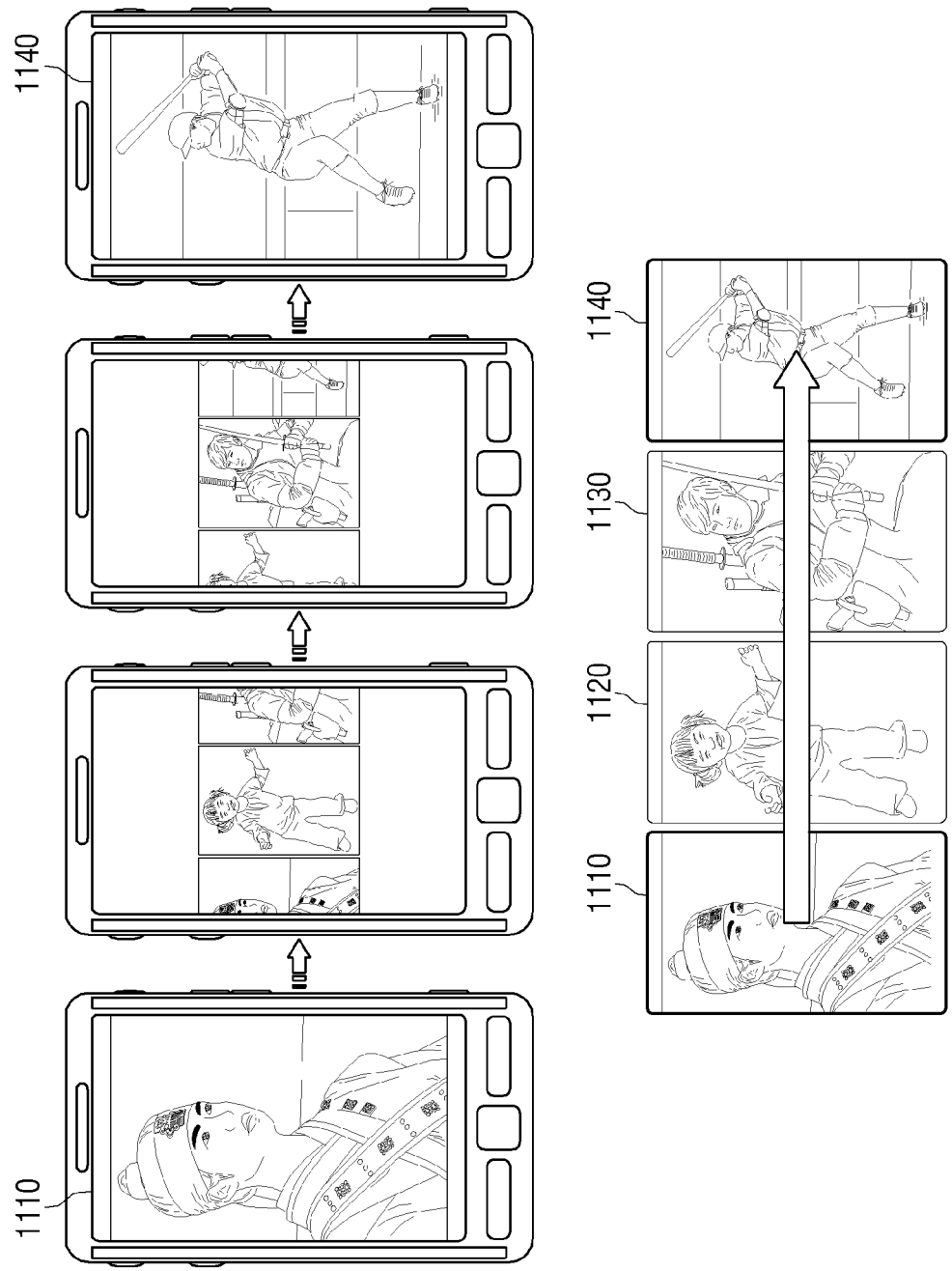

FIG. 11C illustrates an example in which the function of quickly turning several photographs at once, and at a reduced screen size, is a performed as a corresponding UI function, when the pressure detecting unit 130 detects "weak" pressure and the proximity sensor unit 142 detects a "far" proximate gesture. Referring to FIG. 11C, if the pressure detecting unit 130 detects "weak" pressure and the proximity sensor unit 142 detects a "far" proximate gesture, the screen size decreases and the function of turning through three pages of photographs at once is performed as a corresponding UI function. Since the screen is reduced, the user is able to check the second and third photographs 1120 and 1130 between the first and fourth photographs 1110 and 1140 during an interval when the first photograph 1110 is turned to the fourth photograph 1140.

As illustrated in FIG. 11C, if the pressure detecting unit 130 detects "weak" pressure and the proximity sensor unit 142 detects a "far" proximate gesture in a leftward direction, the mobile device 100 changes from displaying the first photograph 1110 to displaying the fourth photograph 1140 at a reduced screen size, thereby turning through three pages of photographs.

Figure 11D:
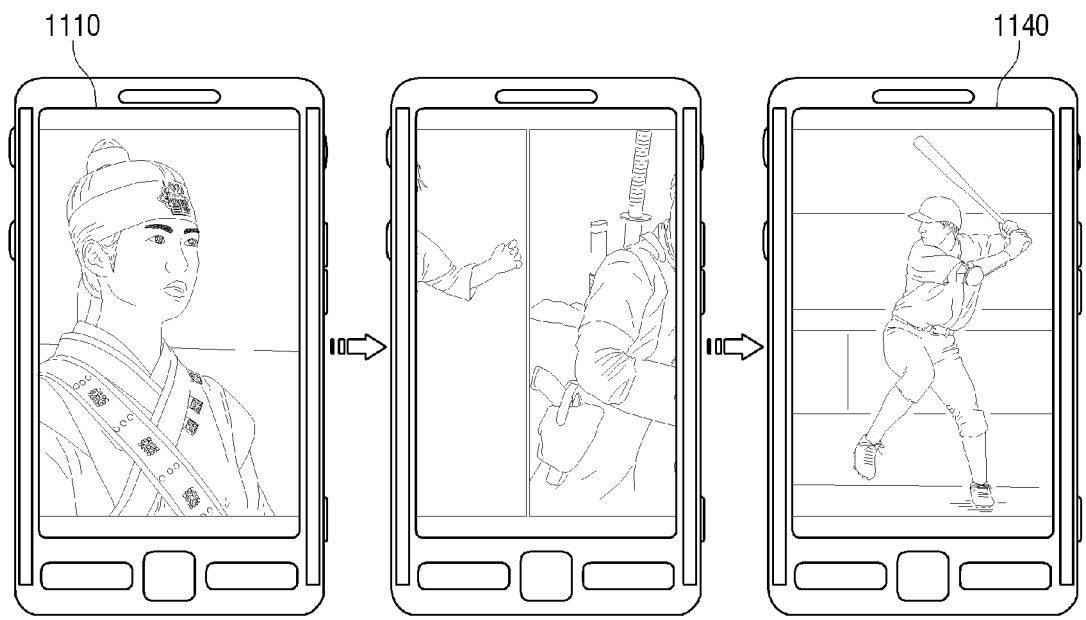
Figure 11D:
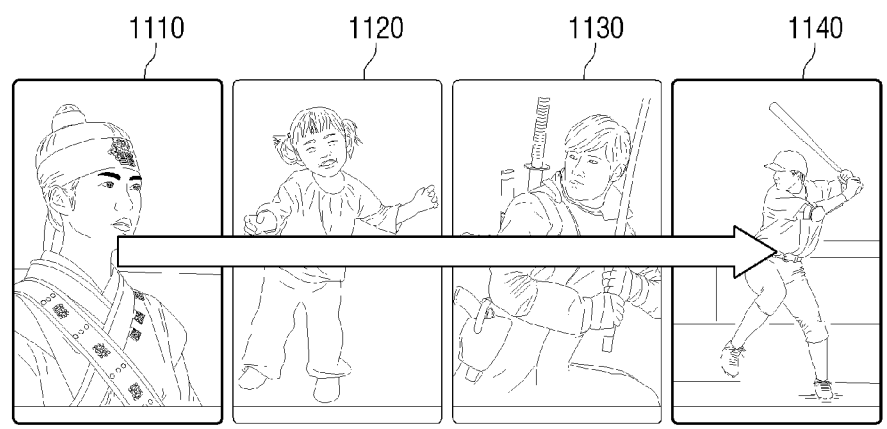

FIG. 11D illustrates an example in which the function of quickly turning through several photographs at once is performed as a corresponding UI function, when the pressure detecting unit 130 detects "intermediate" pressure and the proximity sensor unit 142 detects a "near" proximate gesture. Referring to FIG. 11D, if the pressure detecting unit 130 detects ""intermediate" pressure and the proximity sensor unit 142 detects a "near" proximate gesture, the function of turning three pages of photographs at once is performed as a corresponding UI function. As illustrated in FIG. 11D, if the pressure detecting unit 130 detects "intermediate" pressure and the proximity sensor unit 142 detects a "near" proximate gesture in a leftward direction, the mobile device 100 turns through three pages of photographs at once, by changing from displaying the first photograph 1110 to displaying the fourth photograph 1140.

Figure 11E:
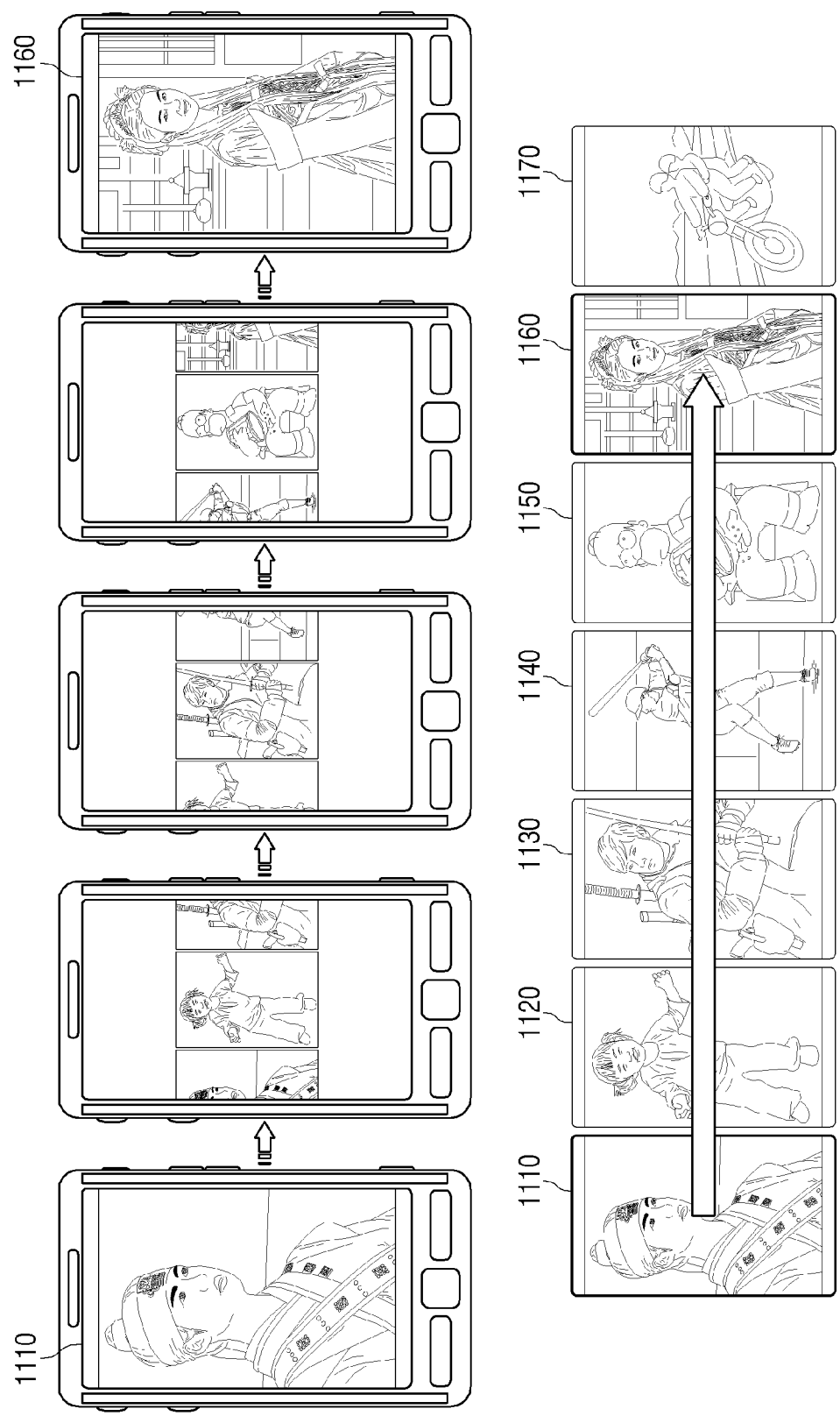

Referring to FIG. 11E, the mobile device 100 may further store a fifth photograph 1150, a sixth photograph 1160, and a seventh photograph 1170.

FIG. 11E illustrates an example where a function of quickly turning through five pages of photographs as a corresponding UI function, when the pressure detecting unit 130 detects "strong" pressure and the proximity sensor unit 142 detects a "near" proximate gesture. If the pressure detecting unit 130 detects "strong" pressure and the proximity sensor unit 142 detects a "near" proximate gesture, the function of turning through five pages of photographs at once is performed as the corresponding UI function. As illustrated in FIG. 11E, if the pressure detecting unit 130 detects "strong" pressure and the proximity sensor unit 142 detects a "near" proximate gesture in leftward direction, the mobile device 100 changes from displaying the first photograph 1110 to displaying the sixth photograph 1160, thereby turning through five photographs at once.

Figure 12:
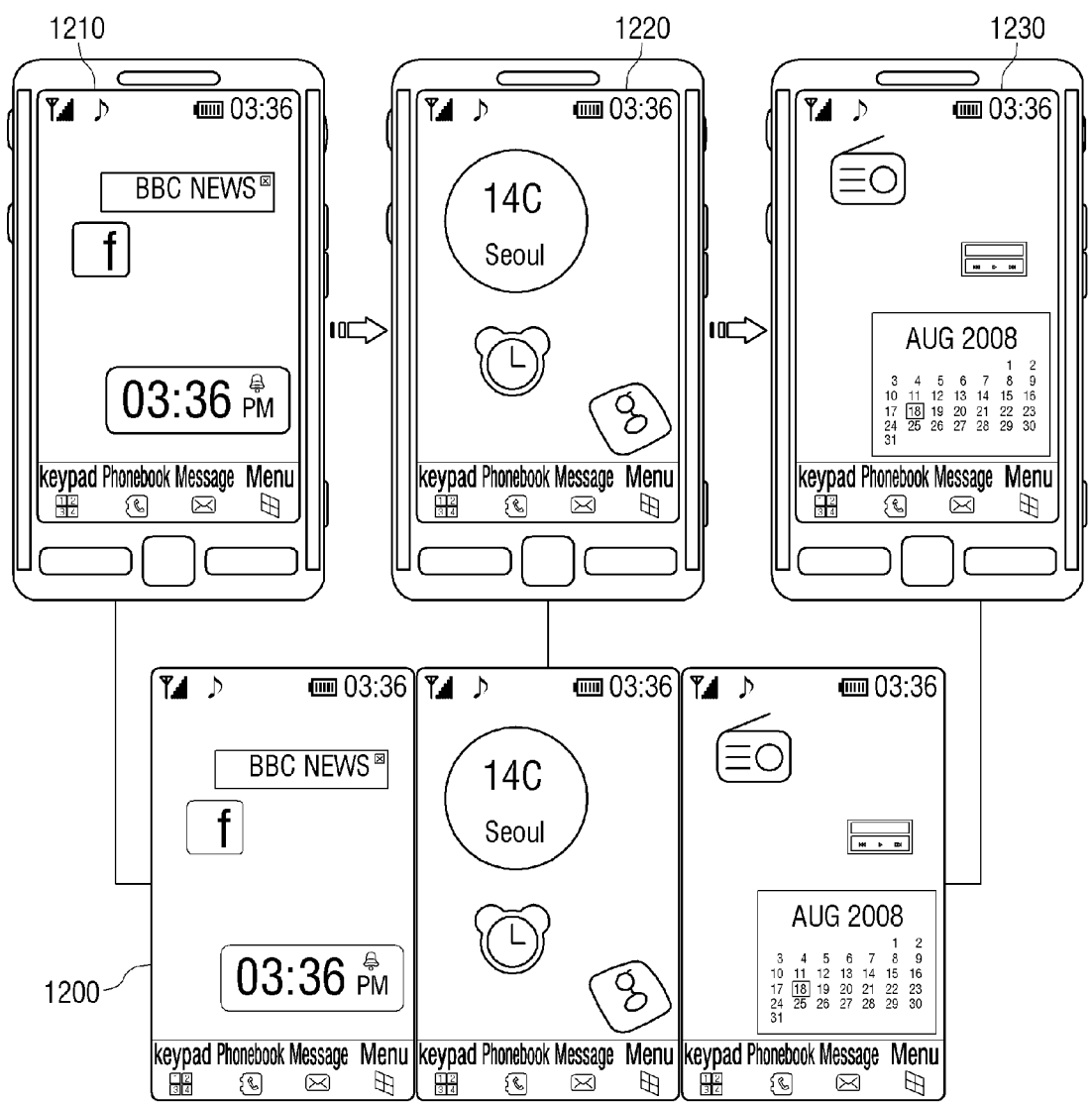
FIG. 12 illustrates a process of moving a widget screen according to an embodiment of the present invention.

FIG. 12 illustrates a process of moving a widget screen according to an embodiment of the present invention. Referring to FIG. 12, an entire width of a widget screen 1200 is three times a display width of the screen of the mobile device 100. Accordingly, the mobile device 100 displays a portion of the whole widget screen 1200 at a time.

If a user's proximate gesture is input in a leftward direction or if the user inputs touch manipulation in a leftward direction, the mobile device 100 displays the widget screen continuously moving in a leftward direction.

However, when the first widget screen 1210 is displayed on the mobile device 100, if the pressure detecting unit 130 detects applied pressure and the proximate gesture in the leftward direction is input into the proximity sensor unit 142, the second widget screen 1220 is displayed directly. Additionally, in a state that the second widget screen 1220 is displayed on the mobile device 100, if the pressure detecting unit 130 detects applied pressure and a proximate gesture in the leftward direction is input into the proximity sensor unit 142, the mobile device 100 displays the third widget screen 1230 directly. In the manner explained above, the mobile device 100 turns the widget screen a whole page unit at a time, if the pressure detecting unit 130 detects the applied pressure and the proximate gesture is input into the proximity sensor unit 142.

Referring to FIGS. 13A to 13H, various examples of executing zoom-in and zoom-out functions using the pressure detecting unit 130 according to embodiments of the present invention are described as follows. FIGS. 13A to 13H illustrate various examples of executing 'zoom-in' and 'zoom-out' functions using the pressure detecting unit 130.

Figure 13A:
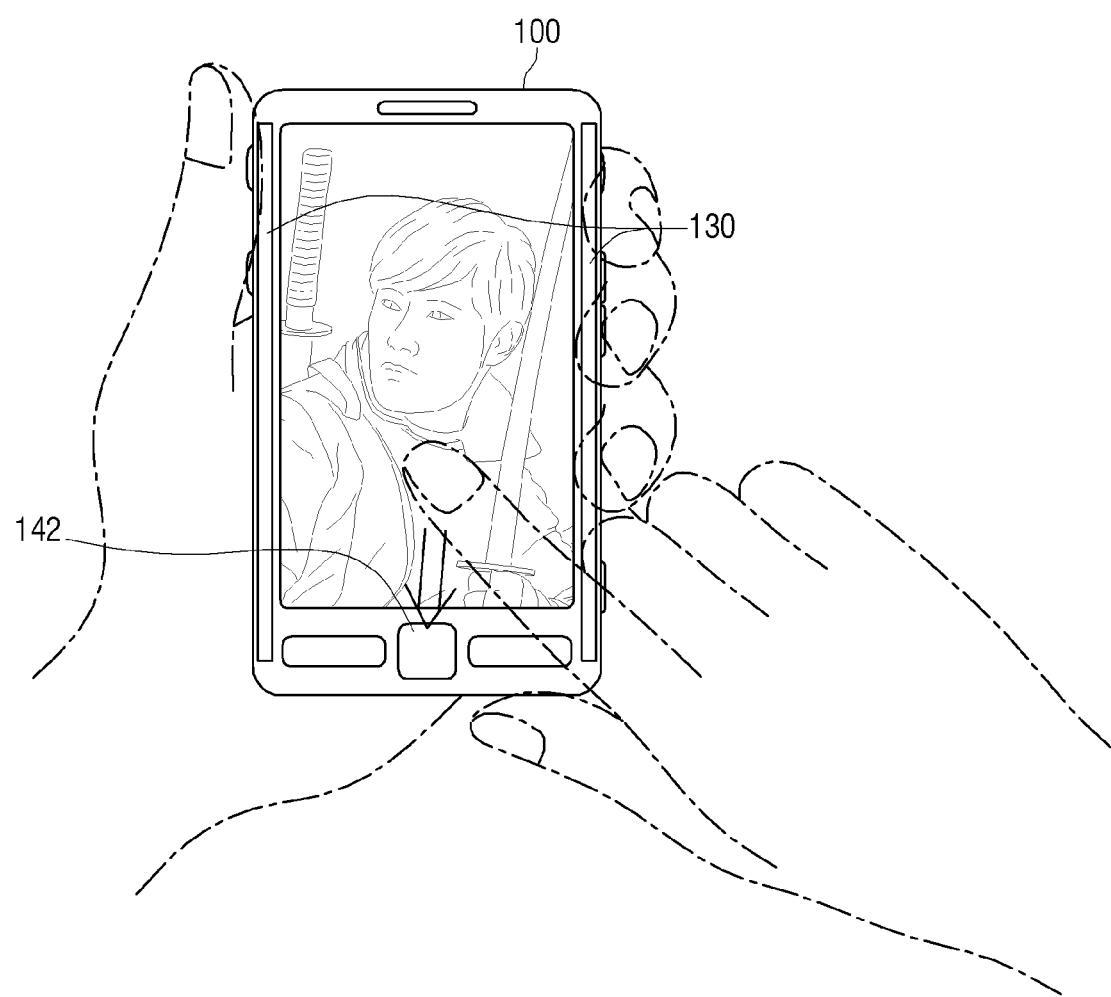
FIGS. 13A to 13H illustrate various methods of executing zoom-in and zoom-out functions using a pressure detecting unit, according to embodiments of the present invention.

FIG. 13A illustrates a method of performing a zoom-in function when a photograph is displayed according to an embodiment of the present invention. Referring to FIG. 13A, when a photograph is displayed, if the pressure detecting unit 130 detects applied pressure and a proximate gesture moving in a direction towards the proximity sensor unit 142 is input, the mobile device 100 zooms in on the displayed photograph.

Figure 13B:
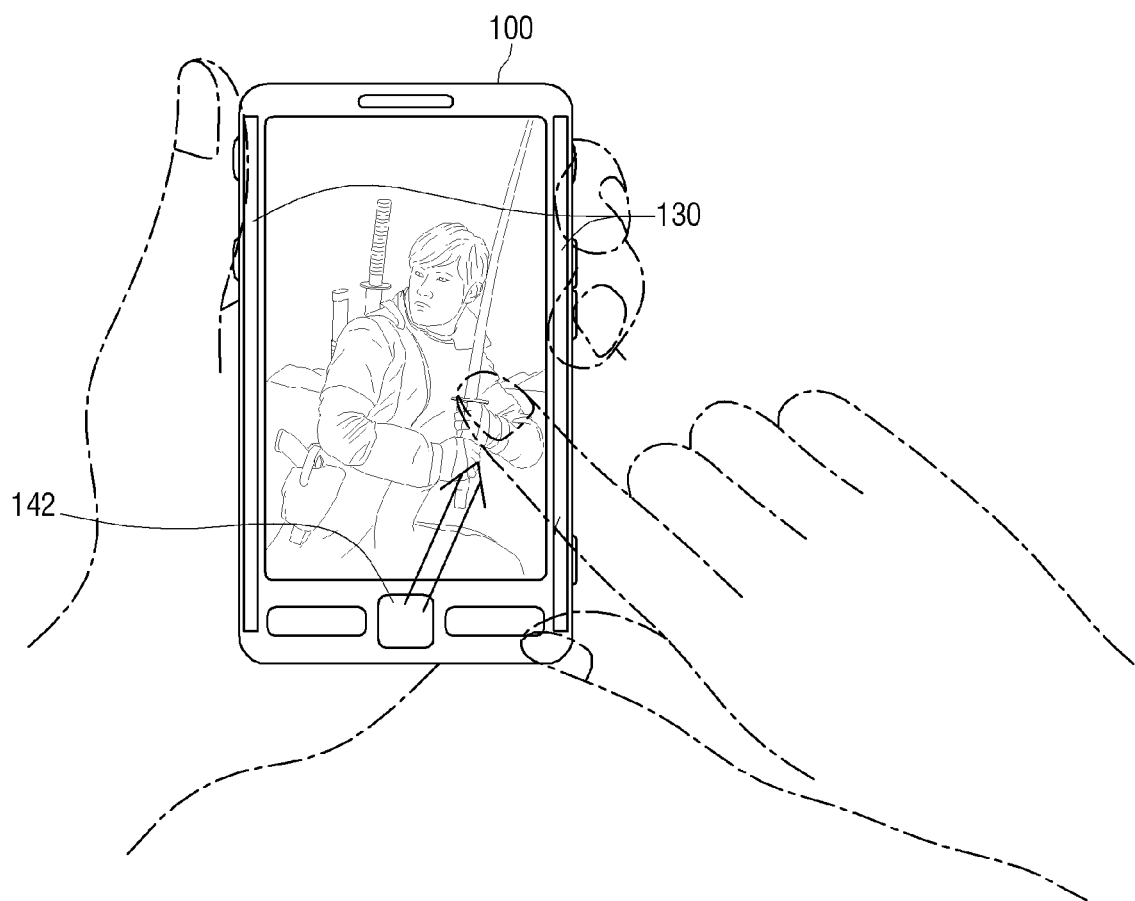

FIG. 13B illustrates a method of performing a zoom-out function when a photograph is displayed according to an embodiment of the present invention. Referring to FIG. 13B, when a photograph is displayed, if the pressure detecting unit 130 detects applied pressure and a proximate gesture moving in a direction away from the proximity sensor unit 142 is input, the mobile device 100 zooms out from the displayed photograph.

Figure 13C:
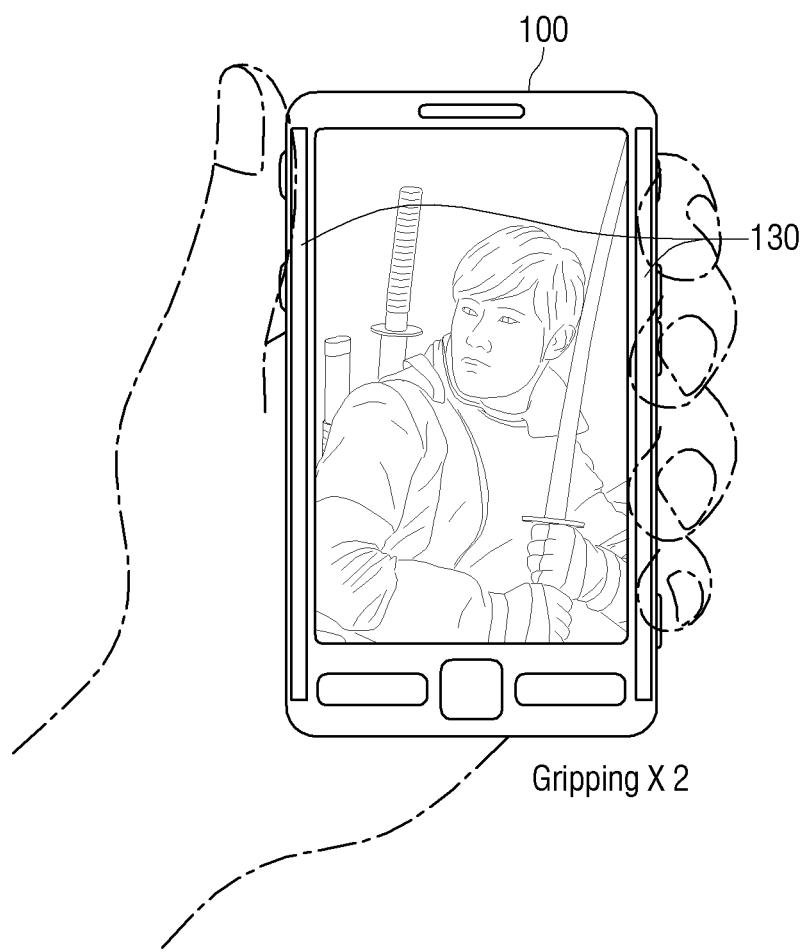

FIG. 13C illustrates another method of performing a zoom-in function when a photograph is displayed according to an embodiment of the present invention. Referring to FIG. 13C, when a photograph is displayed, if the pressure detecting unit 130 detects applied pressure two times in a row (e.g., two instances of gripping the mobile device 100), the mobile device 100 zooms in on the displayed photograph at a specific ratio.

Figure 13D:
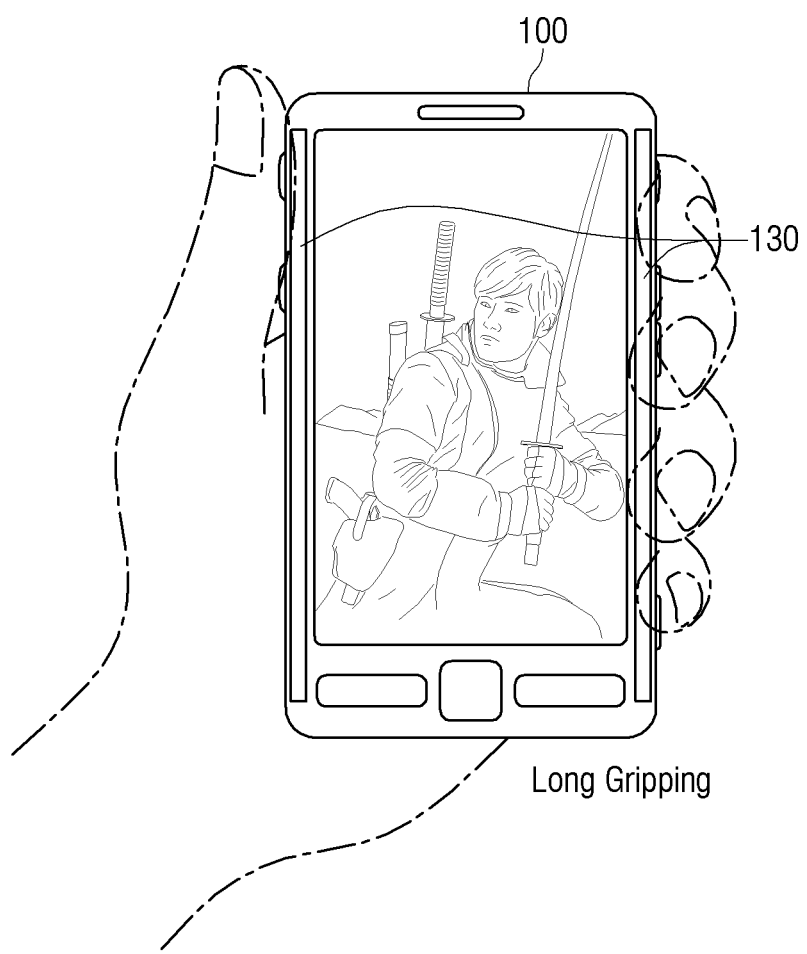

FIG. 13D illustrates a method of performing a zoom-out function when a photograph is displayed according to an embodiment of the present invention. Referring to FIG. 13D, when a photograph is displayed, if the pressure detecting unit 130 detects applied pressure for more than a predetermined time (e.g., gripping for a long duration), the mobile device 100 zooms out from the displayed photograph during the predetermined time that the pressure is applied.

Figure 13E:
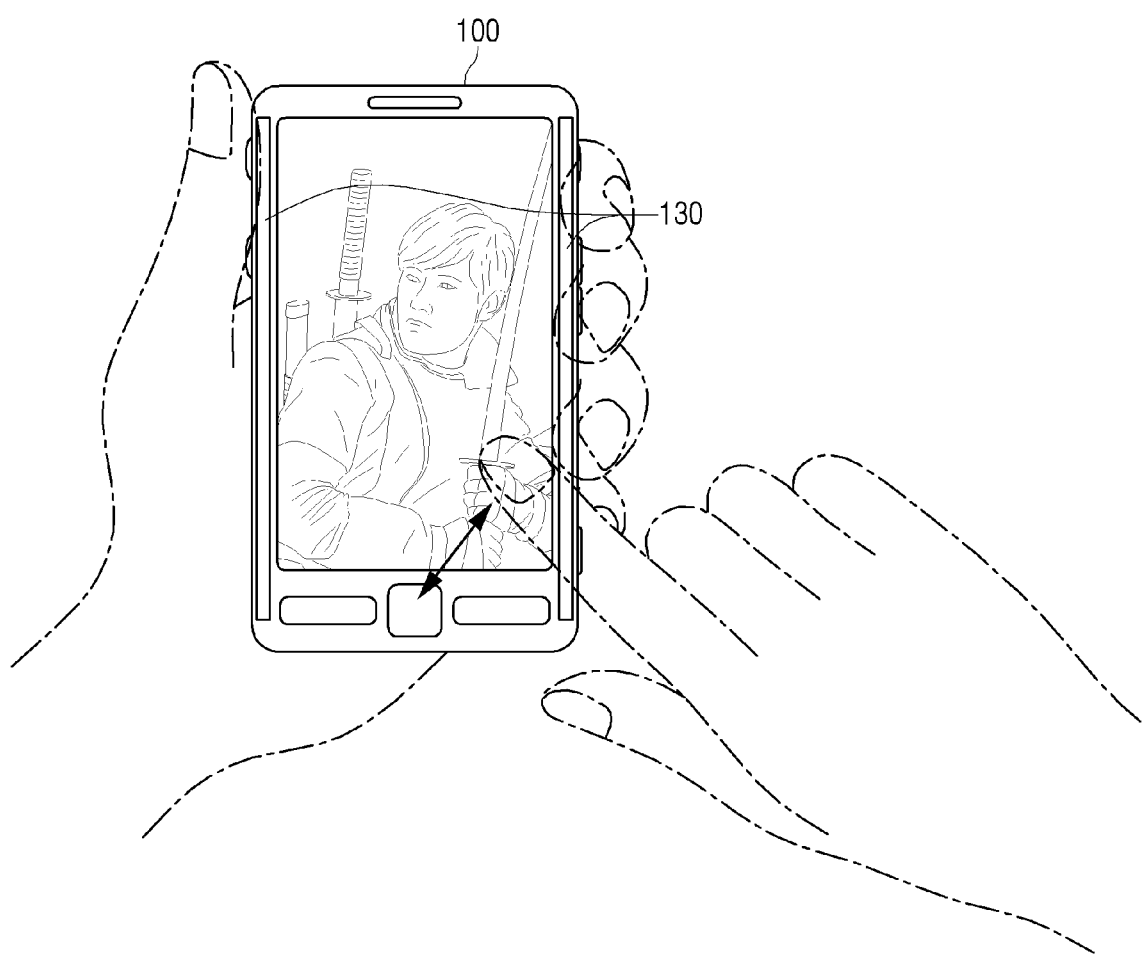

FIG. 13E illustrates a method of performing a zoom-in function when a photograph is displayed according to an embodiment of the present invention. Referring to FIG. 13E, when a photograph is displayed, if the pressure detecting unit 130 detects applied pressure and the proximity sensor unit 142 detects the input of a proximate gesture at a predetermined distance from the proximity sensor unit 142, the mobile device 100 zooms in on the displayed photograph for the duration of time that the proximate gesture is input.

Figure 13F:
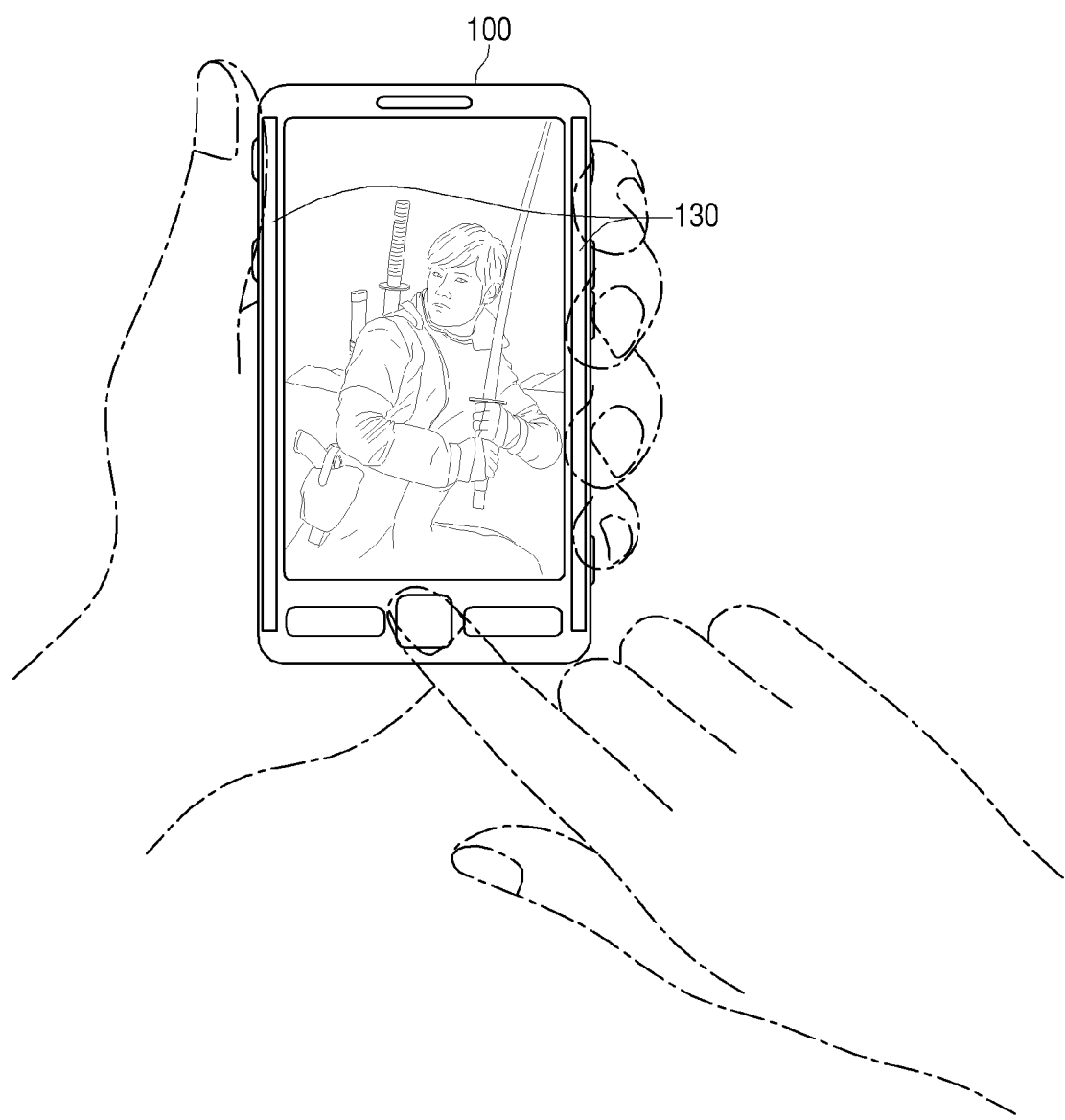

FIG. 13F illustrates a method of performing a zoom-out function when a photograph is displayed according to an embodiment of the present invention. Referring to FIG. 13F, when a photograph is displayed, if the pressure detecting unit 130 detects applied pressure and the proximity sensor unit 142 detects input of a proximate gesture at a distance zero (0) (i.e., the user is touching the proximity sensor unit 142), the mobile device 100 zooms out from the displayed photograph for the duration of time that the user is touching the proximity sensor unit 142.

Figure 13G:
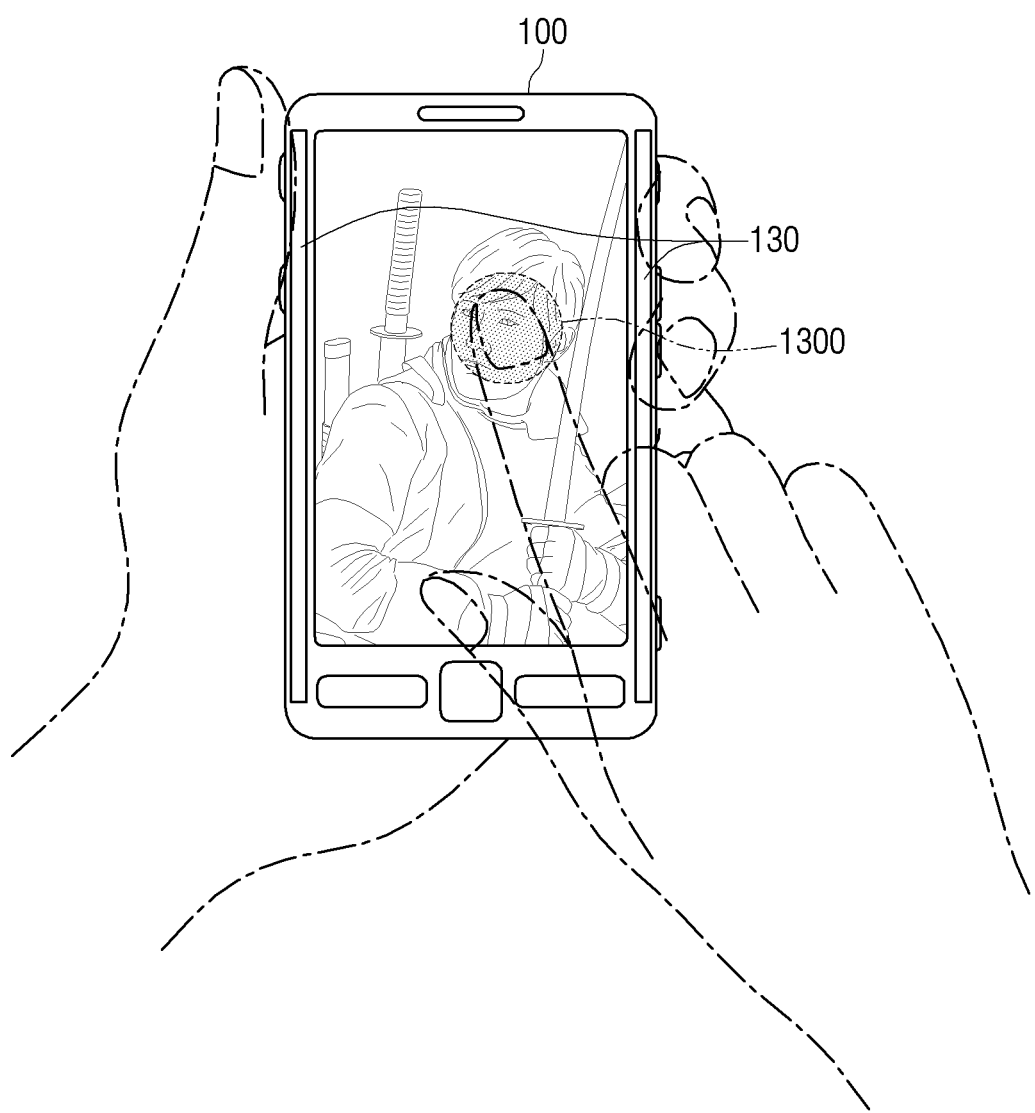
Figure 13H:
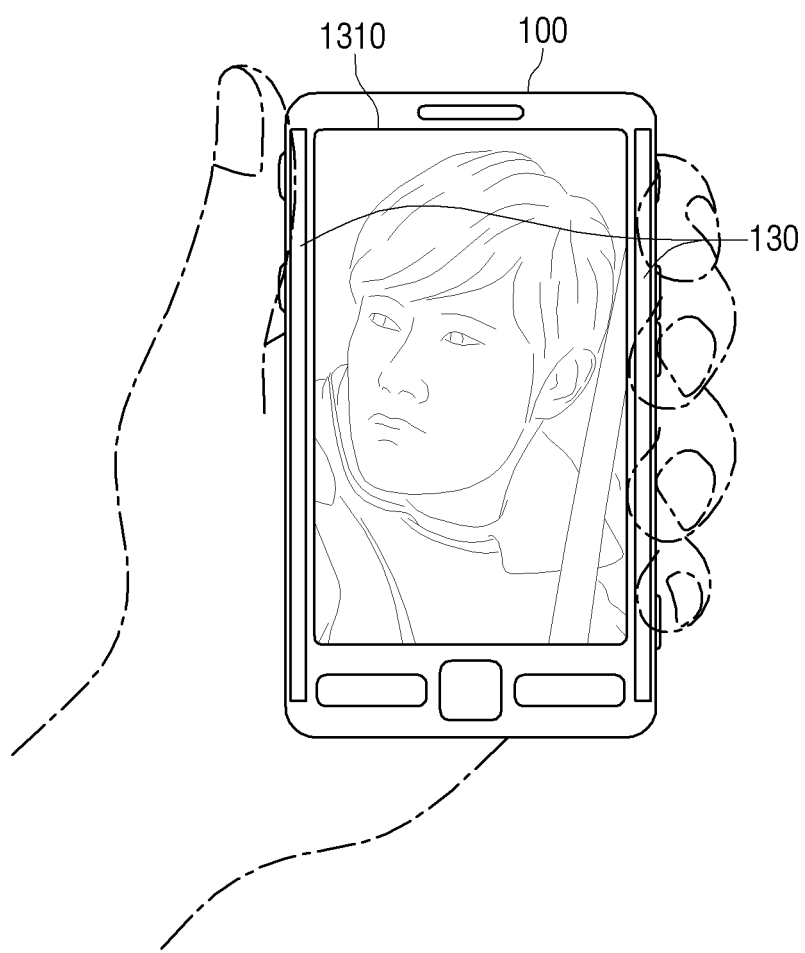

FIGS. 13G and 13H illustrate a method of performing a zoom-in function with respect to a specific area when a photograph is displayed according to an embodiment of the present invention. Referring to FIG. 13G, when a photograph is displayed, if the pressure detecting unit 130 detects applied pressure and a touch manipulation touching a specific area 1300 is input into the touch detecting unit 144, the mobile device 100 zooms in on the photograph with respect to the specific are 1300.

Accordingly, as illustrated in FIG. 13G, when a photograph is displayed, if the user applies pressure on the pressure detecting unit 130 and touches the specific area 1300 on the screen, as illustrated in FIG. 13H, the mobile device 100 displays an enlarged photograph 1310, zoomed in with respect to the touched area, on the screen.

Then, if the detecting unit 130 does not continue to detect applied pressure while the enlarged photograph 1310 is displayed, the mobile device 100 returns to displaying the original photograph as illustrated in FIG. 13G.

As explained above, the mobile device 100 is capable of providing various zoom-in and zoom-out functions, using the pressure detecting unit 130.

Hereinbelow, the function of notifying the location of pointer or currently-selected icon using the pressure detecting unit 130 and the proximity sensor unit 142 is described in greater detail, with reference to FIGS. 14 to 16C.

Figure 14:
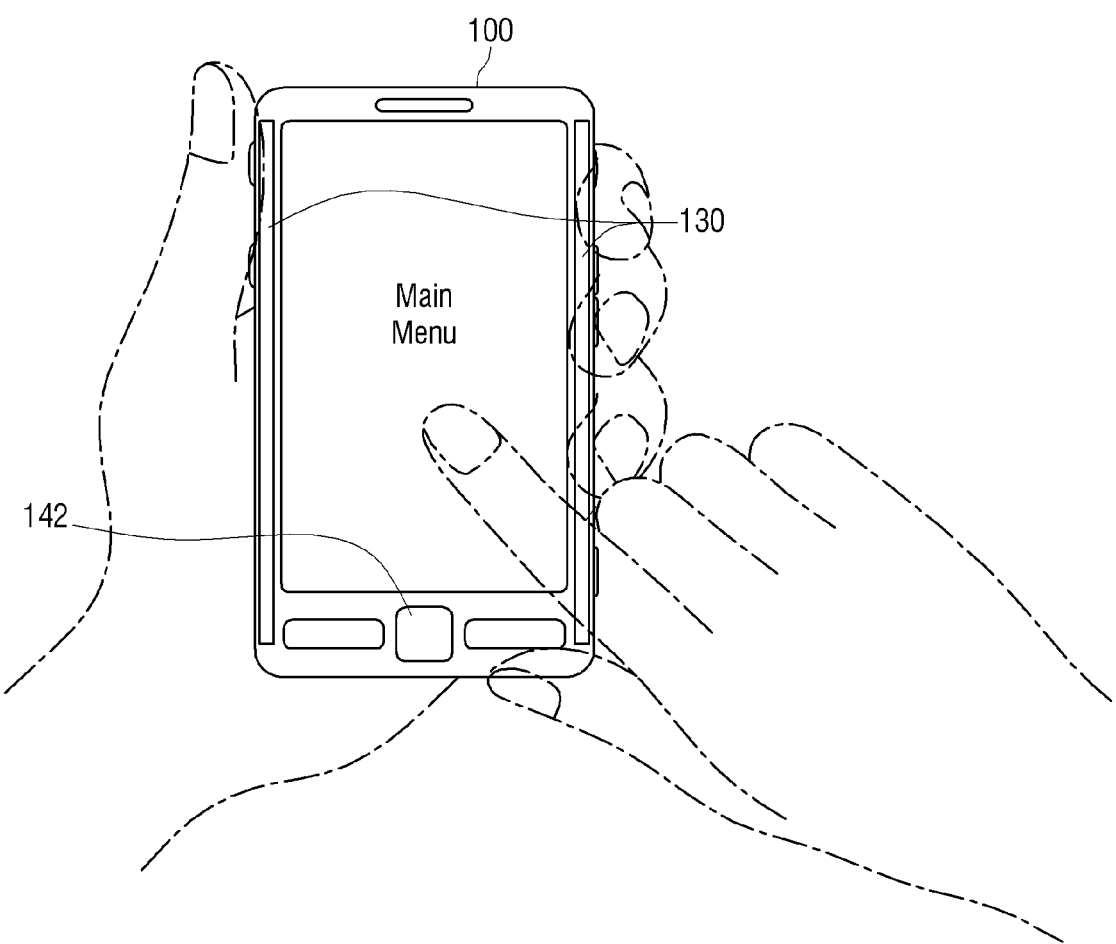
FIG. 14 illustrates a manipulation of a pressure detecting unit and a proximity sensor unit to execute an alarm function, according to an embodiment of the present invention.

FIG. 14 illustrates user manipulation with respect to the pressure detecting unit 130 and the proximity sensor unit 142 to execute the function of notification according to an embodiment of the present invention. Referring to FIG. 14, when a main menu is displayed on the screen, if the pressure detecting unit 130 detects applied pressure and the proximity sensor unit 142 detects a proximate gesture moving in a direction towards the proximity sensor unit 142, the mobile device 100 outputs a notification of a current location of the pointer or a location of a currently-selected icon.

Figure 15A:
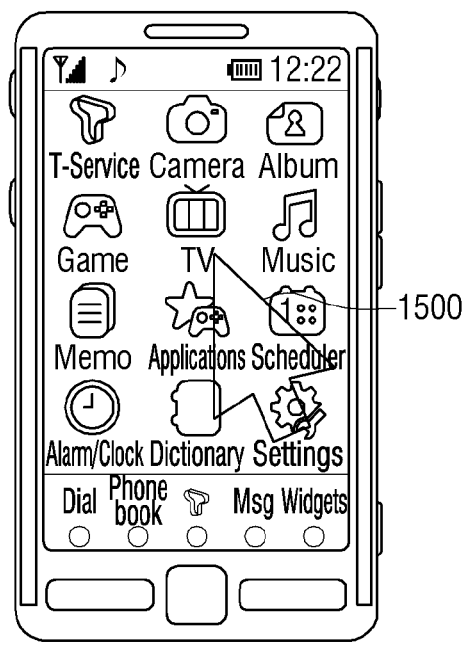
FIGS. 15A to 15C illustrate a pointer on a main menu gradually decreasing in size as a user's hand moves towards a proximity sensor unit, according to an embodiment of the present invention.
Figure 15B:
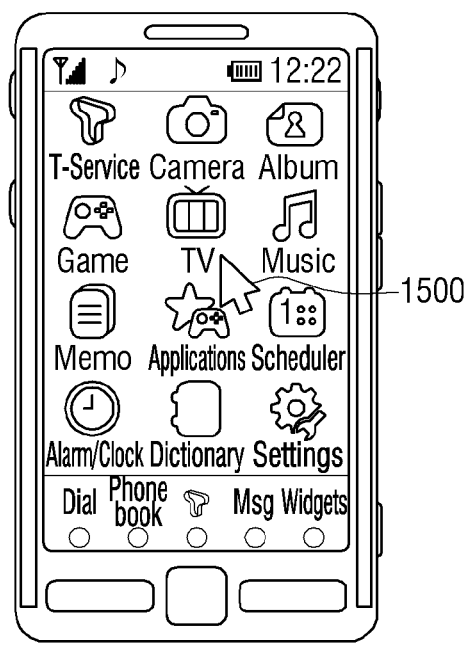
Figure 15C:

FIGS. 15A to 15C illustrate an example in which a pointer 1500 on the main menu gradually decreases in size as the user's hand moves closer to the proximity sensor unit 142 according to an embodiment of the present invention. FIG. 15A illustrates an example in which the pointer 1500 is displayed with a large size when the user's hand is at a distance from the proximity sensor unit 142. FIG. 15B illustrates an example in which the pointer 1500 is displayed with an intermediate size when the user's hand is at an intermediate distance from the proximity sensor unit 142. FIG. 15C illustrates an example in which the pointer 1500 is displayed with a small size when the user's hand is close to the proximity sensor unit 142.

As explained above, the pointer 1500 displayed on the main menu gradually decreases in size as the user's hand moves closer to the proximity sensor unit 142, thereby providing the user with an effect simulating a pointer at a distance moving closer toward the user.

Figure 16A:
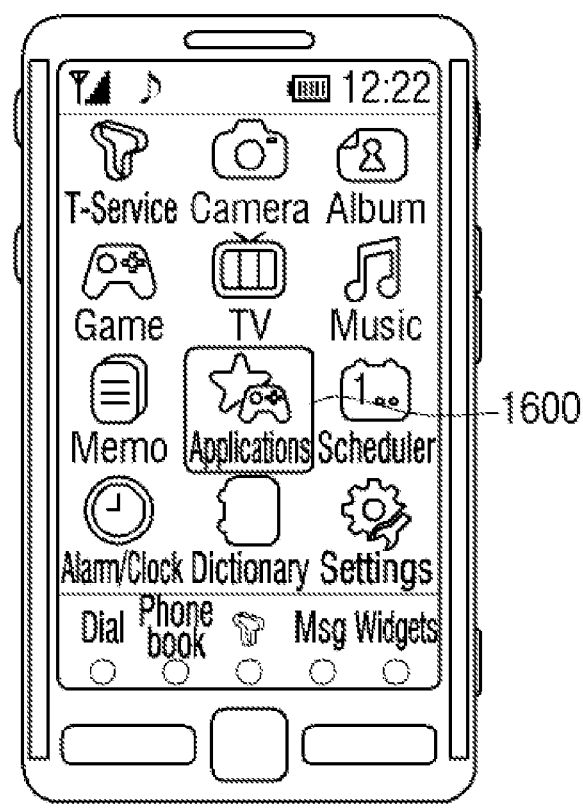
FIGS. 16A to 16C illustrate an icon selected on a main menu increasing in size as a user's hand moves towards a proximity sensor unit, according to an embodiment of the present invention.
Figure 16B:
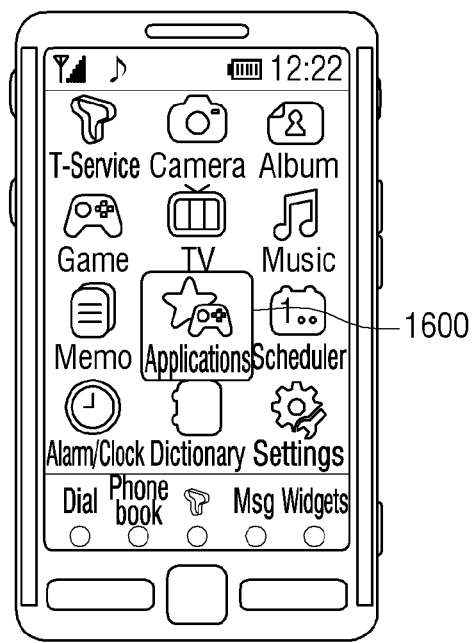
Figure 16C:
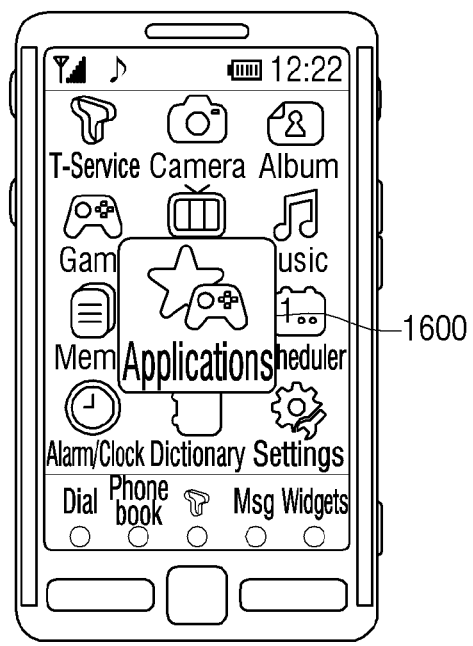

FIGS. 16A to 16C illustrate an example in which an icon 1600 selected from the main menu gradually increases in size as the user's hand moves closer to the proximity sensor unit 142 according to an embodiment of the present invention. FIG. 16A illustrates an example in which the selected icon 1600 is displayed at an original size when the user's hand is relatively distant from the proximity sensor unit 142. FIG. 16B illustrates an example in which the selected icon 1600 is displayed in a somewhat increased size, when the user's hand is positioned at an intermediate distance from the proximity sensor unit 142. FIG. 16C illustrates an example in which the selected icon 1600 is displayed in large size when the user's hand is close to the proximity sensor unit 142.

As explained above, the selected icon 1600 on the main menu gradually increases in size as the user's hand moves closer to the proximity sensor unit 142, thereby providing the user with an effect simulating the selected icon 1600 moving closer toward the user.

Hereinbelow, a process of zooming in a main menu and displaying a submenu is explained with reference to FIGS. 17A to 17E.

Figure 17A:
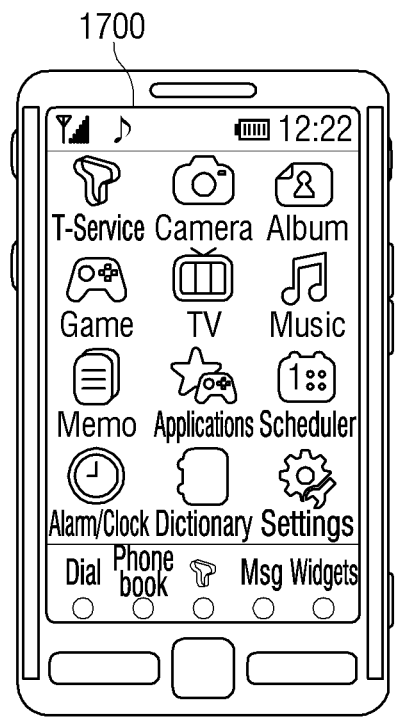
FIGS. 17A to 17E illustrate a process of zooming in on a main menu and displaying of a submenu, according to an embodiment of the present invention.
Figure 17B:
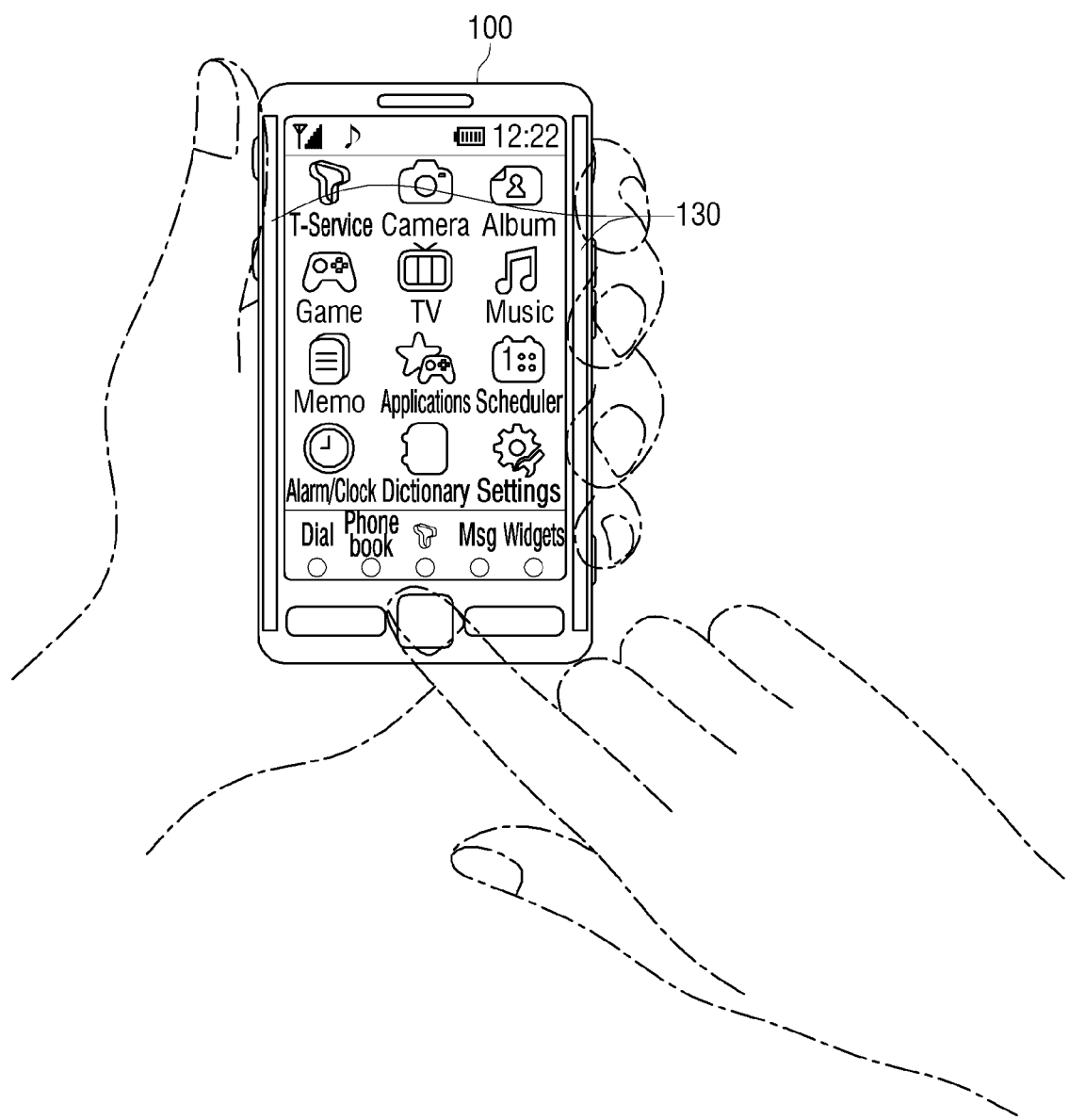

FIG. 17A illustrates a screen of the mobile device 100 on which a main menu 1700 is displayed according to an embodiment of the present invention. In this state, as illustrated in FIG. 17B, if the pressure detecting unit 130 detects applied pressure and the proximity sensor unit 142 detects proximate gesture moving closer to the proximity sensor unit 142, the mobile device 100 zooms in with respect to the main menu 1700.

Figure 17C:
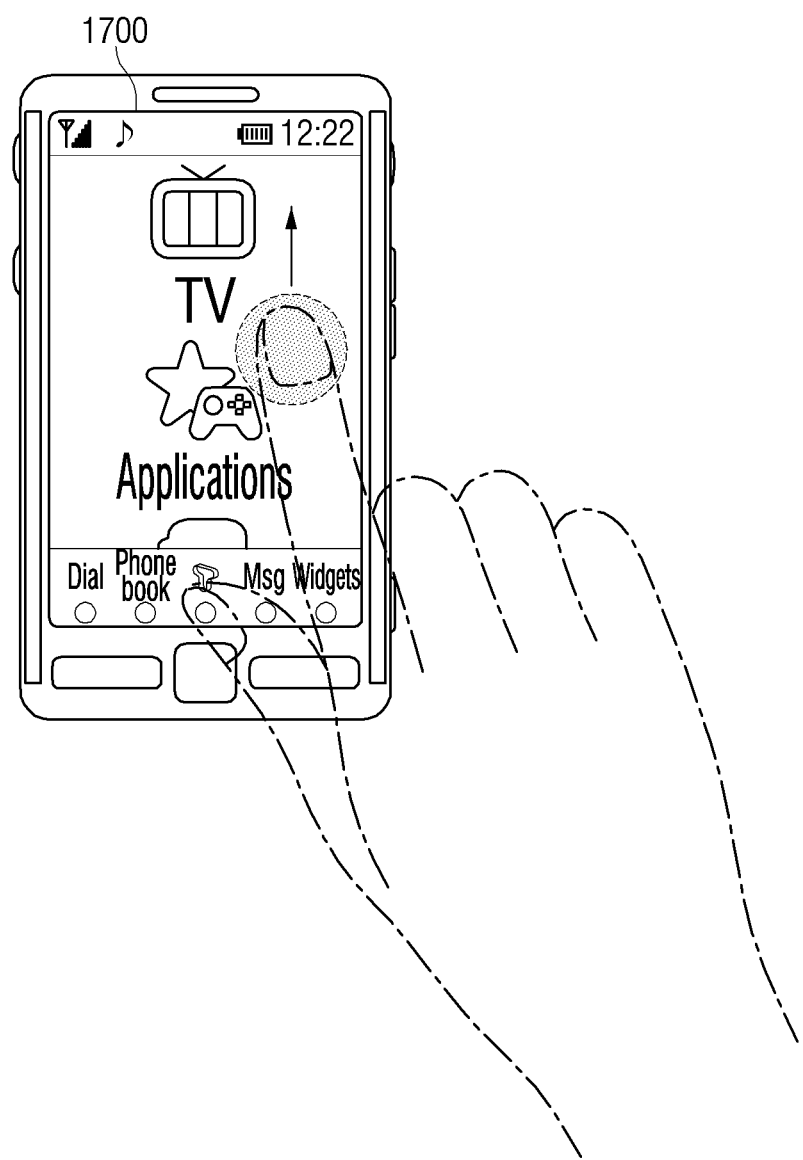

Accordingly, as illustrated in FIG. 17C, a zoomed-in main menu 1710 is displayed on the screen. In such a state, if the user inputs a panning touch manipulation with respect to a specific spot 1720, the screen of the zoomed-in main menu moves. The phrase "panning touch manipulation" herein refers to a movement while in contact with a screen in a predetermined direction.

Figure 17D:
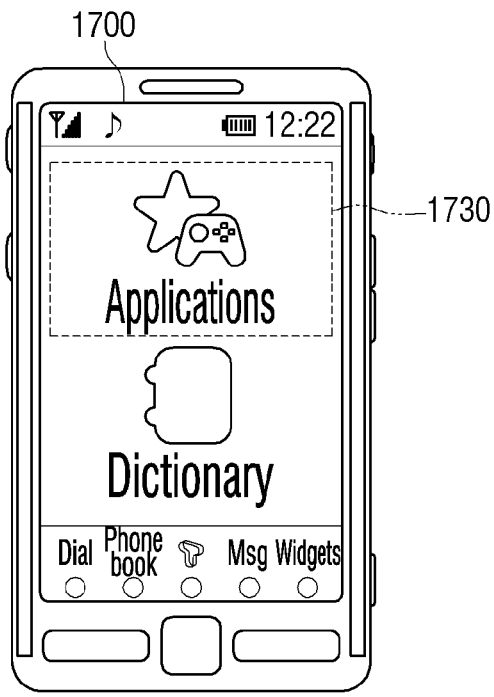

FIG. 17D illustrates the zoomed-in main menu 1710 after the zoomed-in menu 1710 is moved in response to the user's panning touch manipulation. If a specific icon 1740 is continuously displayed on a specific area 1730 for a predetermined time, as illustrated in FIG. 17D, the mobile device 100 displays submenu 1750 related to the specific icon 1740 on the screen.

Figure 17E:
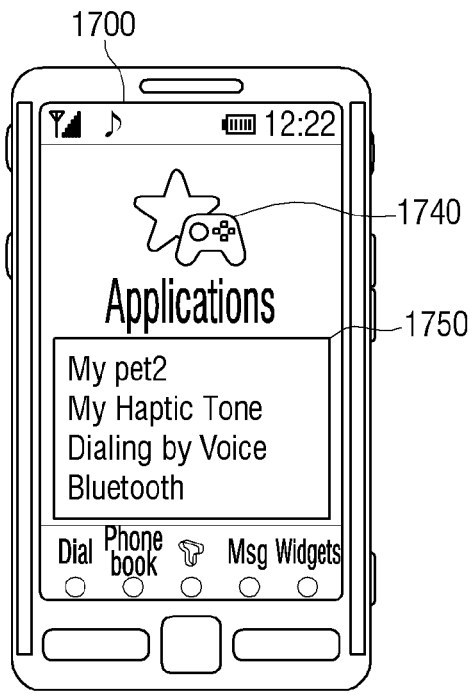

FIG. 17E illustrates an example in which the submenu 1750 related to the specific icon 1740 is displayed on the screen according to an embodiment of the present invention.

As explained above, the user is able to zoom in main menu and display the submenu of a specific icon on screen, using the pressure detecting unit 130 and the proximity sensor unit 142.

Figure 18A:
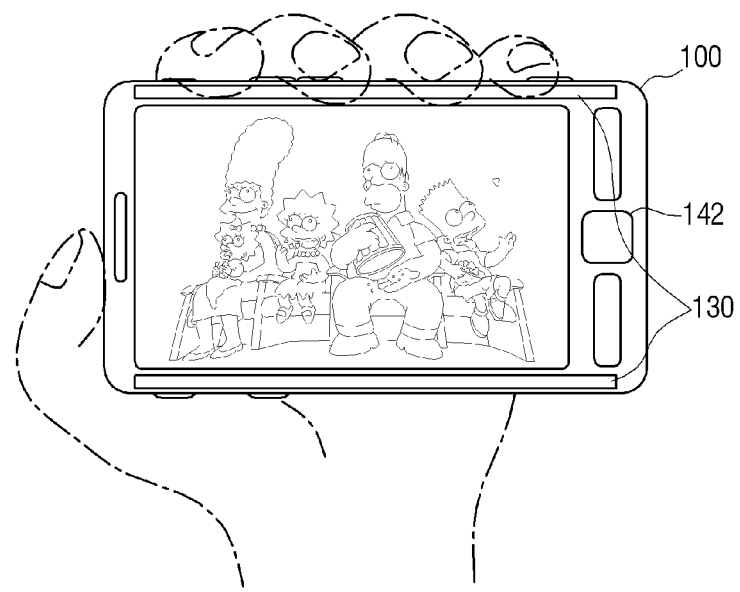
FIGS. 18A to 18C illustrate a process of displaying a hidden menu using a pressure detecting unit and a proximity sensor unit, according to an embodiment of the present invention.
Figure 18B:
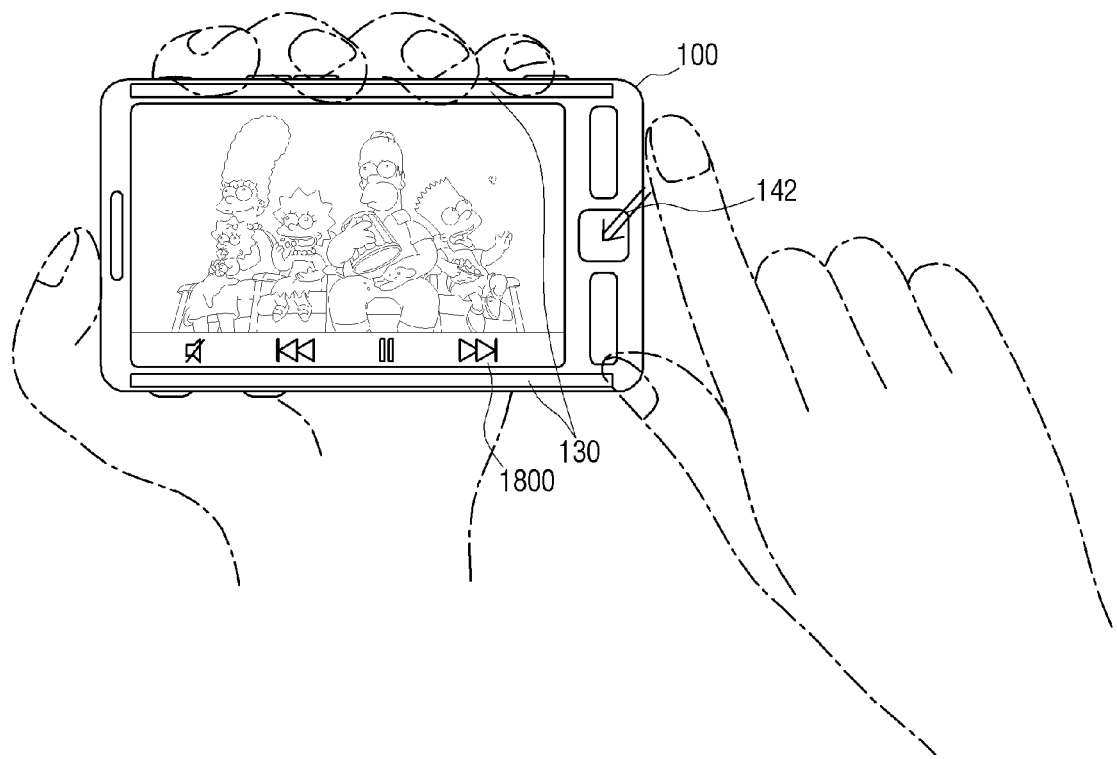
Figure 18C:
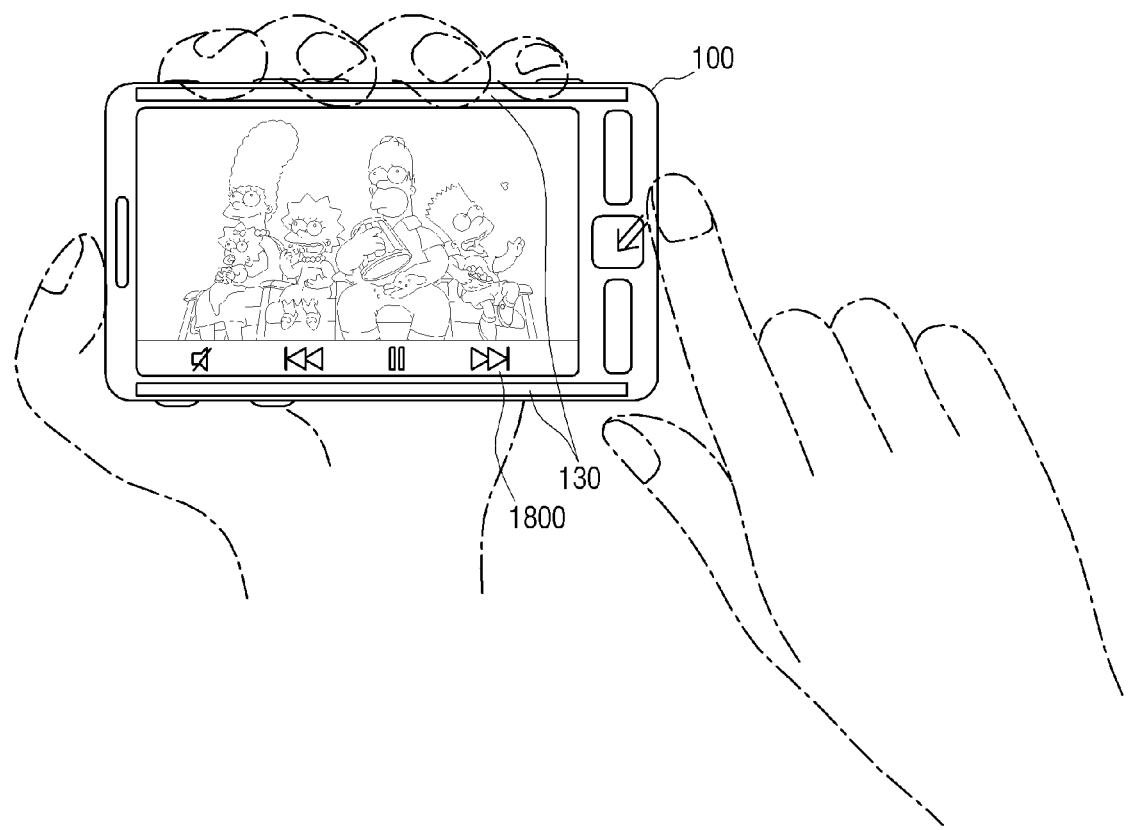

Hereinbelow, a process for displaying a hidden menu using the pressure detecting unit 130 and the proximity sensor unit 142 is described with reference to FIGS. 18A to 18C. FIGS. 18A to 18C illustrate a process for displaying a hidden menu using the pressure detecting unit 130 and the proximity sensor unit 142 according to an embodiment of the present invention.

FIG. 18A illustrates a screen of the mobile device 100 on which a video is played back according to an embodiment of the present invention. Referring to FIG. 18A, the mobile device 100 activates the proximity sensor unit 142 upon detecting pressure applied through the pressure detecting unit 130.

Referring to FIG. 18B, if the pressure detecting unit 130 detects pressure and the proximity sensor unit 142 detects a proximate gesture moving closer to the proximity sensor unit 142, the mobile device 100 displays a hidden menu 1800 semi-transparently on the screen.

Referring to FIG. 18C, as the user's proximate gesture moves closer to the proximity sensor unit 142, the mobile device 100 displays the hidden menu 1800 in gradually increased clarity.

As explained above, the user is able to display hidden menu on the screen, using the pressure detecting unit 130 and the proximity sensor unit 142 of the mobile device 100.

Hereinbelow, a process of changing a currently-executed application using the pressure detecting unit 130 and the proximity sensor unit 142 according to an embodiment of the present invention is described with reference to FIGS. 19A to 19D.

Figure 19A:
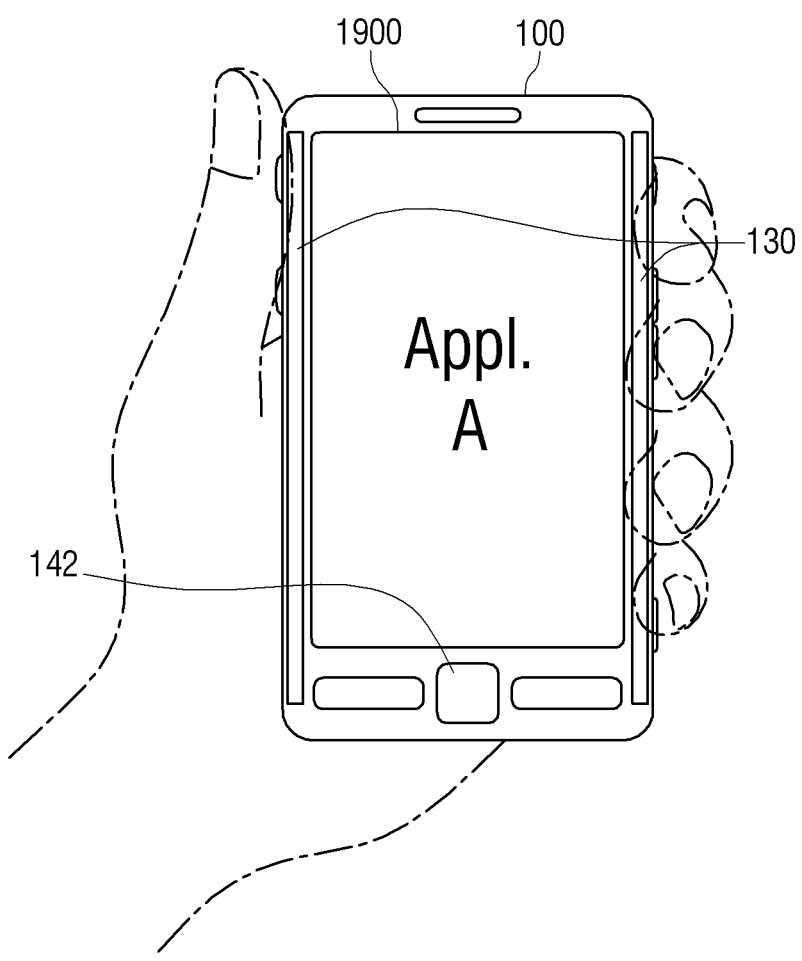
FIGS. 19A to 19D illustrate a process changing a currently-executed application using a pressure detecting unit and a proximity sensor unit, according to an embodiment of the present invention.
Figure 19B:
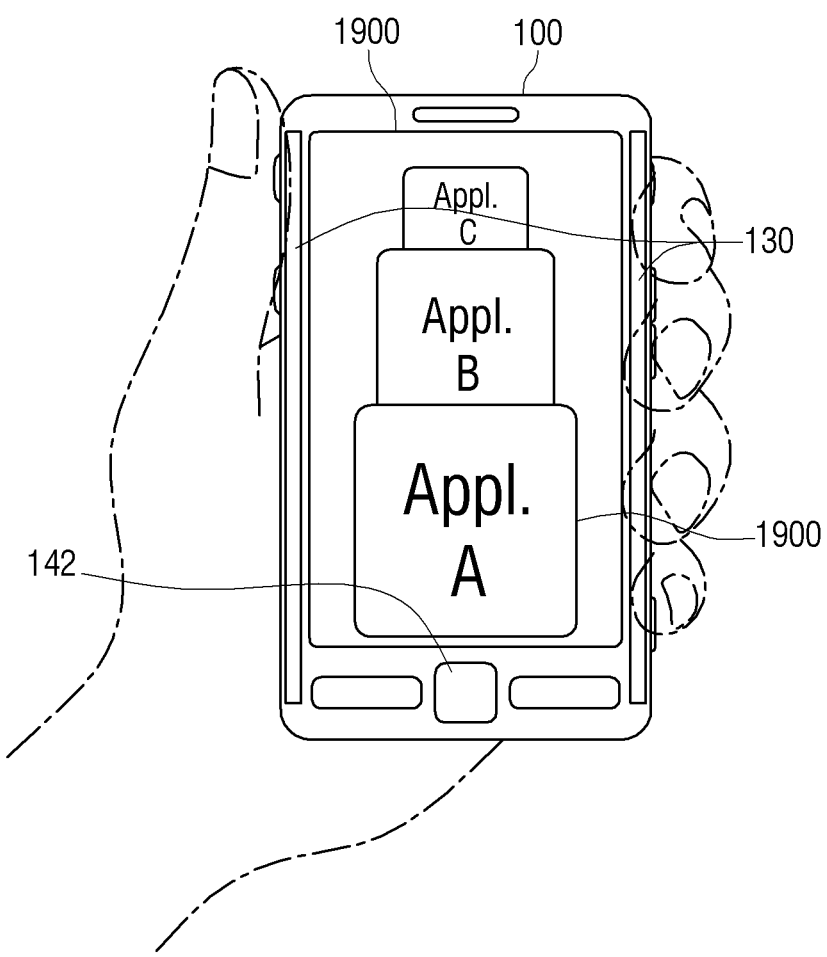

FIG. 19A illustrates a screen on which application A 1900 is executed according to an embodiment of the present invention. Referring to FIG. 19A, in a state that application A 1900 is executed, if the pressure detecting unit 130 detects applied pressure, an application list, such as illustrated in FIG. 19B, appears on the screen.

Figure 19C:
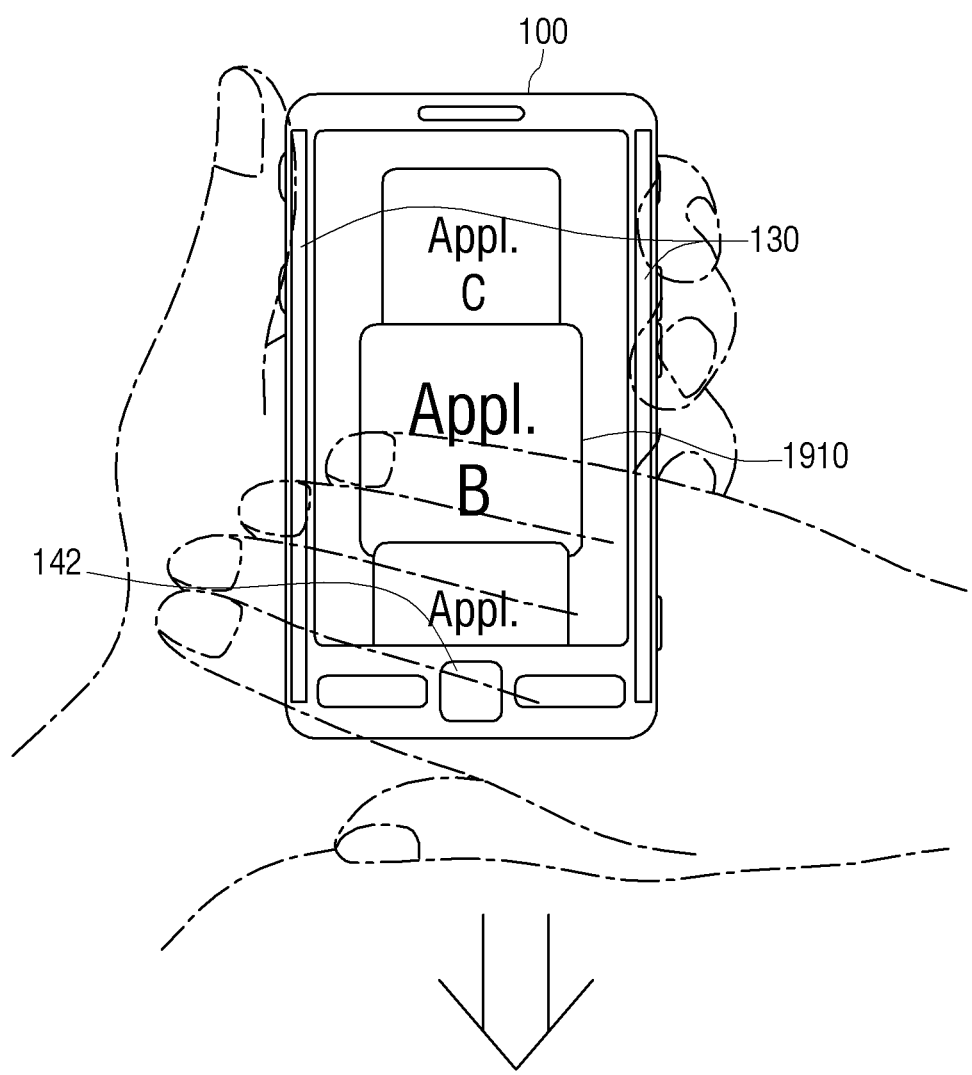

Referring to FIG. 19C, if the proximity sensor unit 142 detects a proximate gesture moving in a downward direction, the application list is scrolled in a downward direction. Accordingly, as illustrated in FIG. 19C, application B 1910 is selected as an application currently selected from the application list.

Figure 19D:
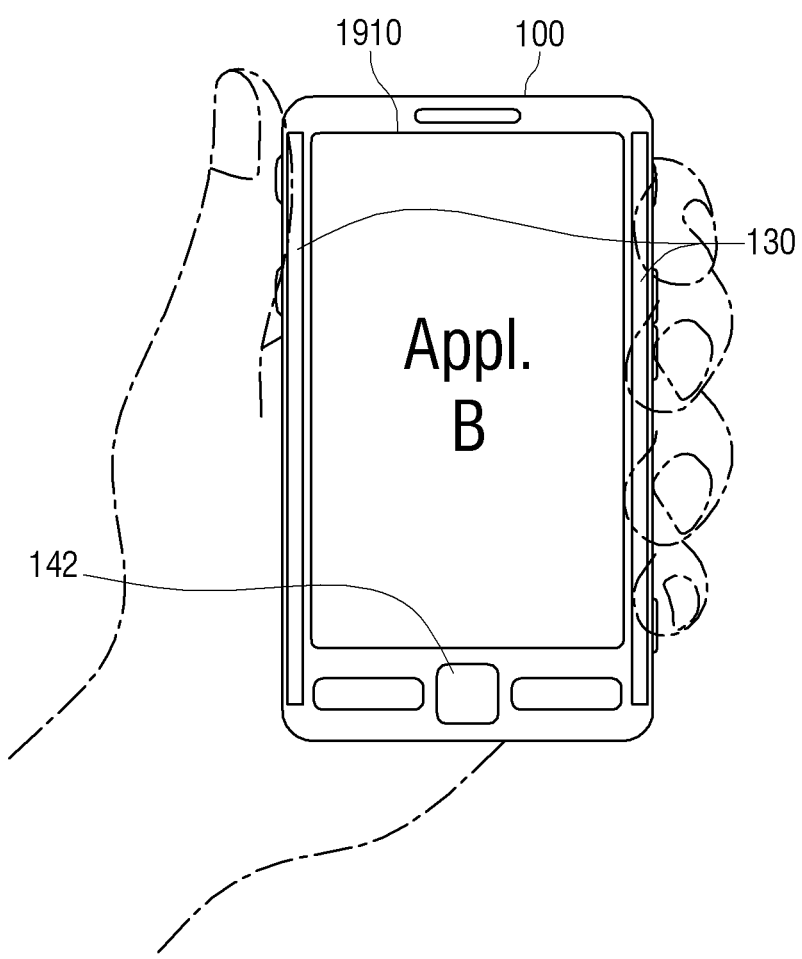

After application B 1910 is selected, if the pressure detecting unit 130 does not continue to detect the pressure, such as illustrated in FIG. 19D, the mobile device 100 displays a screen where application B 1910 is executed.

As explained above, the user is able to change a currently-executed application on the mobile device 100, using the pressure detecting unit 130 and the proximity sensor unit 142.

Figure 20A:
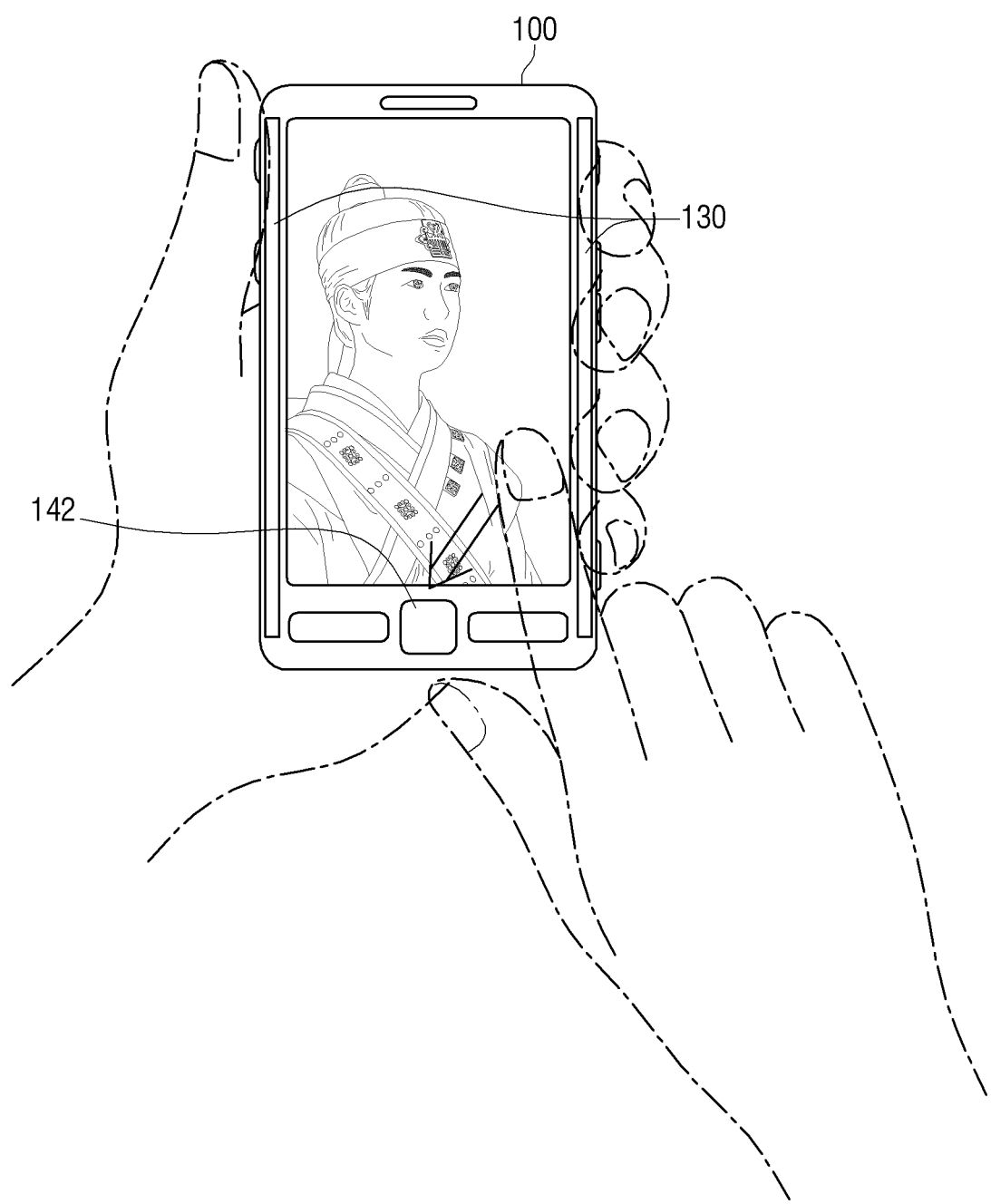
FIGS. 20A to 20C illustrate a process displaying a quick menu using a pressure detecting unit, a proximity sensor unit and a button unit, according to an embodiment of the present invention.
Figure 20B:
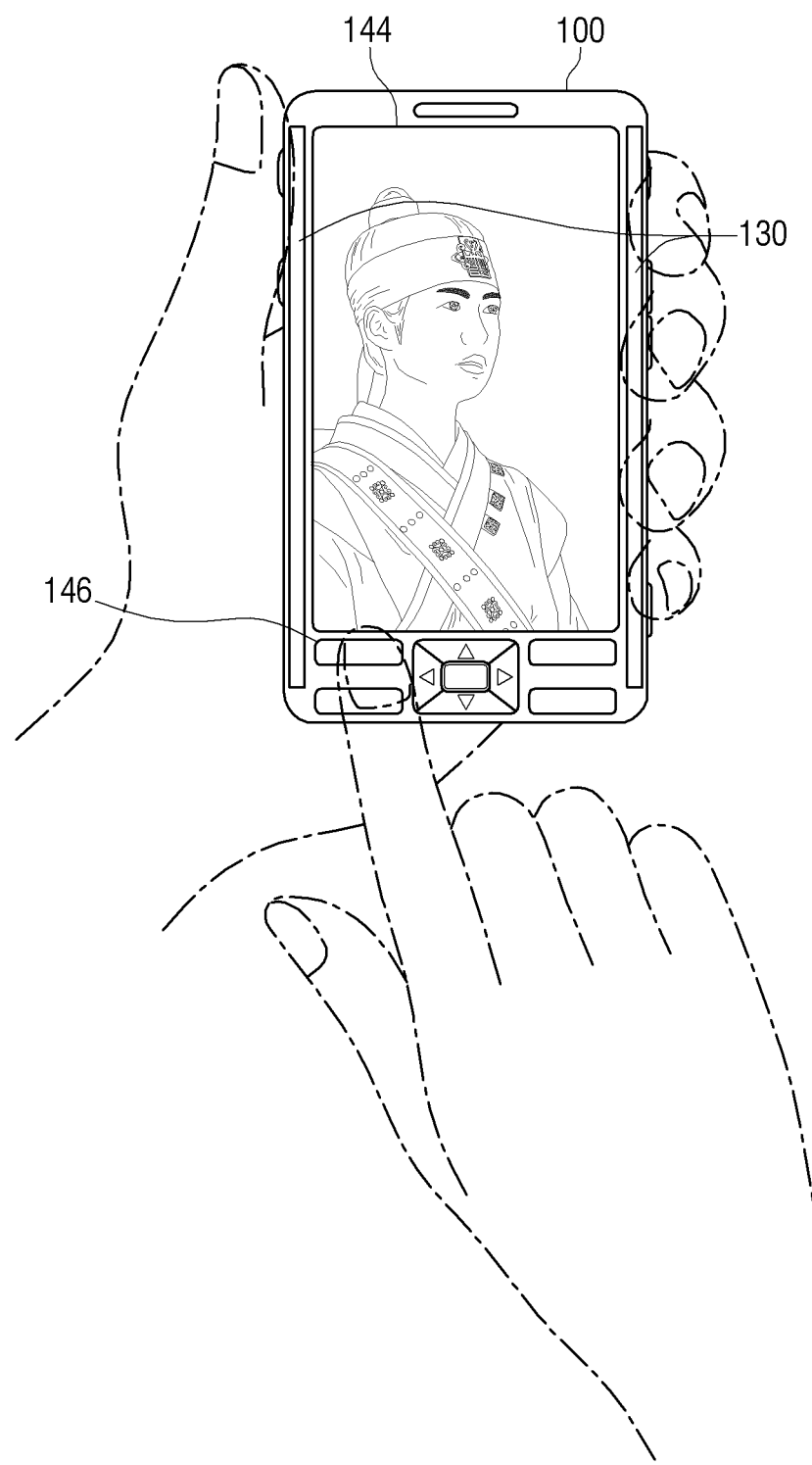
Figure 20C:
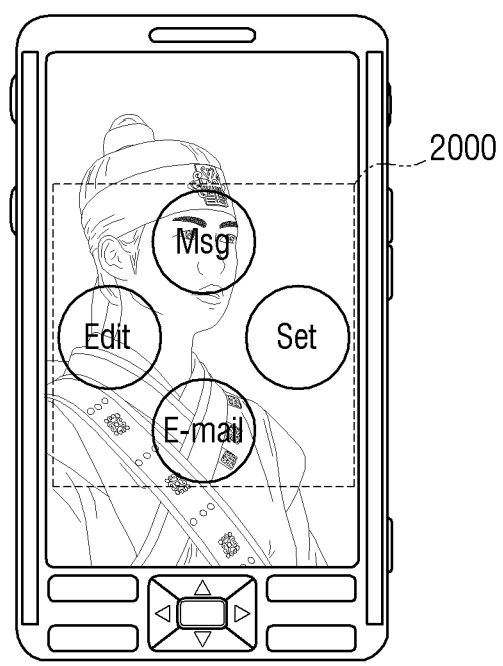

Referring to FIGS. 20A to 20C, a process of displaying a quick menu using the pressure detecting unit 130, the proximity sensor unit 142 and the button unit 146, according to an embodiment of the present invention, is described.

FIG. 20A illustrates an example in which the user applies pressure to the pressure detecting unit 130, and inputs a proximate gesture moving in a direction towards the proximity sensor unit 142. Accordingly, if the pressure detecting unit 130 detects applied pressure and the proximity sensor unit 142 detects proximate gesture moving closer to the proximity sensor unit 142, the mobile device 100 displays a quick menu 2000 on the screen, as illustrated in FIG. 20C. The term "quick menu" herein refers to a separate collection of frequently used menus. The quick menu item may be set by the user, or preset in the mobile device 100.

FIG. 20B illustrates an example in which the user applies pressure to the pressure detecting unit 130 and inputs a specific button manipulation through the button unit 146. Accordingly, if the pressure detecting unit 130 detects applied pressure and a manipulation is input with respect to the specific button of the button unit 146, as illustrated in FIG. 20C, the mobile device 100 displays the quick menu 2000 on the screen.

As explained above, the user is able to display the quick menu on the screen of the mobile device 100, using the pressure detecting unit 130, the proximity sensor unit 142 and the button unit 146.

Meanwhile, any type of device that can detect applied pressure and receive a user's manipulation may be implemented as the mobile device 100 according to embodiments of the present invention. For example, the mobile device 100 may be implemented as a pressure-detectable mobile phone, a TeleVision (TV), a Motion Picture Experts' Group Audio Layer 3 (MP3) player, a Personal Media Player (PMP), a Personal Digital Assistant (PDA), a laptop computer, a personal computer, etc.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A mobile device, comprising:
   a pressure detecting unit configured to detect pressure;
   a user interface unit configured to perform a user interface; and
   a control unit configured to control the user interface unit to activate when the pressure detecting unit detects pressure and to determine a function being performed by a user interface input through the user interface unit and the pressure detected at the pressure detecting unit.

2. The mobile device of claim 1, wherein the user interface unit comprises:
   a proximity sensor unit configured to detect whether a user moves closer to the proximity sensor unit and detect a presence of a proximate gesture;
   a touch detecting unit configured to detect a touch manipulation; and
   a button unit configured to detect a button manipulation,
   wherein the control unit is further configured to control at least one of the proximity sensor unit, the touch detecting unit, and the button unit to activate when the pressure detecting unit detects pressure.

3. The mobile device of claim 1, wherein the user interface unit comprises a proximity sensor unit configured to detect whether a user moves closer to the proximity sensor unit and detect a presence of a proximate gesture,
   wherein the control unit is further configured to control the function to perform when the pressure detecting unit detects the pressure and the proximity sensor unit detects the presence of the proximate gesture, and
   the function to be performed is related to a specific application currently being executed.

4. The mobile device of claim 1, wherein the user interface unit comprises a touch detecting unit configured to detect a touch manipulation,
   wherein the control unit is further configured to control the function to perform when the pressure detecting unit detects the pressure and the touch detecting unit detects the touch manipulation, and
   the function to be performed is related to a specific application currently being executed.

5. The mobile device of claim 1, wherein the user interface unit comprises a button unit configured to detect a button manipulation,
   wherein the control unit is further configured to control the function to perform when the pressure detecting unit detects the pressure and the button unit detects the button manipulation, and
   the function to be performed is related to a specific application which is currently being executed.

6. The mobile device of claim 1, wherein the control unit is further configured to determine the function to be performed by the user interface input through the user interface unit, based on a magnitude of the pressure detected at the pressure detecting unit.

7. The mobile device of claim 1, wherein the pressure detecting unit comprises at least one pressure detecting area, and
   wherein the control unit is further configured to determine the function to be performed by a user interface input through the user interface unit, based on the at least one pressure detecting area, that detects the pressure.

8. The mobile device of claim 1, wherein the control unit is further configured to determine the function to be performed by a user interface input through the user interface unit, based on a number of times the pressure detecting unit detects the pressure.

9. A method for providing a User Interface (UI), comprising:
   detecting, at a pressure detecting unit, a pressure;
   activating a user interface unit that provides a user interface, when the pressure detecting unit detects the pressure;
   performing the user interface through the user interface unit; and determining a function being performed by the user interface input through the user interface unit and the pressure detected at the pressure detecting unit.

10. The method of claim 9, further comprising:

detecting whether a user moves closer to the proximity sensor unit and detecting a presence of a proximate gesture, through a proximity sensor unit;

detecting a touch manipulation, through a touch detecting unit; and detecting a button manipulation, through a button unit, wherein activating the user interface unit includes activating at least one of the proximity sensor unit, the touch detecting unit, and the button unit when the pressure detecting unit detects the pressure.

11. The method of claim 10, further comprising performing the function when the pressure detecting unit detects the pressure and the proximity sensor unit detects the presence of the proximate gesture, wherein the function to be performed is related to a specific application which is currently being executed.

12. The method of claim 10, further comprising performing the function when the pressure detecting unit detects the pressure and the touch detecting unit detects the touch manipulation, wherein the function to be performed is related to a specific application which is currently being executed.

13. The method of claim 10, further comprising performing the function when the pressure detecting unit detects the pressure and the button unit detects the button manipulation, wherein the function to be performed is related to a specific application which is currently being executed.

14. The method of claim 9, further comprising:

determining the function to be performed by the user interface input through the user interface unit, based on a magnitude of the pressure detected at the pressure detecting unit.

15. The method of claim 9, further comprising:

determining the function to be performed by the user interface, based on the pressure detecting area from among at least one pressure detecting area of the pressure detecting unit for detecting the pressure.

16. The method of claim 9, further comprising:

determining the function to be performed by the user interface, based on a number of times the pressure detecting unit detects the pressure.

* * * * *